US012576739B1

(12) United States Patent (10) Patent No.: US 12,576,739 B1

Sarwat et al. (45) Date of Patent: Mar. 17, 2026

(54) SYSTEMS AND METHODS FOR IMPROVING MISALIGNMENT DURING WIRELESS CHARGING

(71) Applicants:Arif I. Sarwat, Miami, FL (US); Milad Behnamfar, Miami, FL (US)

(72) Inventors: Arif I. Sarwat, Miami, FL (US); Milad Behnamfar, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 19/069,805

(22) Filed: Mar. 4, 2025

(51) Int. Cl.
| | |
|---|---|
| *H02J 50/90* | (2016.01) |
| *B60L 53/122* | (2019.01) |
| *B60L 53/38* | (2019.01) |
| *H02J 50/00* | (2016.01) |
| *H02J 50/12* | (2016.01) |

(52) U.S. Cl.
CPC ............. *B60L 53/38* (2019.02); *B60L 53/122* (2019.02); *H02J 50/005* (2020.01); *H02J 50/12* (2016.02); *H02J 50/90* (2016.02)

(58) Field of Classification Search
CPC ...................................................... H02J 50/90
USPC ......................................................... 320/108
See application file for complete search history.

(56) References Cited

U.S. PATENT DOCUMENTS

| | | | | |
|---|---|---|---|---|
| 5,821,731 | A * | 10/1998 | Kuki ....................... | B60L 53/14 |
| | | | | 320/108 |
| 12,090,880 | B2 * | 9/2024 | Bhat ..................... | B60L 53/122 |
| 2015/0246620 | A1 * | 9/2015 | Fukushima ............. | H02J 50/12 |
| | | | | 307/10.1 |
| 2017/0182903 | A1 * | 6/2017 | Kwasnick ............. | B60L 53/122 |
| 2024/0339866 | A1 * | 10/2024 | Mishima ................. | H02J 50/12 |

OTHER PUBLICATIONS

Byjus, Fixed Point Iteration, https://byjus.com/maths/fixed-point-iteration/, Jan. 16, 2023 (Year: 2023).*

* cited by examiner

*Primary Examiner* — Ahmed H Omar
(74) *Attorney, Agent, or Firm* — SALIWANCHIK, LLOYD & EISENSCHENK

(57) ABSTRACT
Systems and methods are provided for improving misalignment during wireless charging (e.g., during wireless charging of electric vehicles (EVs)). A transmitter coil can be disposed on a mobile plate, which can act as a robot to move the transmitter. A magnetic field sensor can be installed on the transmitter pad to measure the magnetic field, and the measured magnetic field can be compared with the highest magnetic field value, with the error being sent to a controller. The controller can send a command to the robot to move the transmitter to adjust itself to be better aligned with the receiver. This can continue until the transmitter and the receiver are in a well-aligned state.

20 Claims, 22 Drawing Sheets

| Name | X | Y | Z | B |
| --- | --- | --- | --- | --- |
| m3 | 0.000 | 0.138 | 100.418 | 8.631e-01 |

| Measure | P1:ampl(F1) | P2:freq(F1) | P3:duty(F1) | P4:freq(C2) | P5:duty(C2) | P6:ampl(C2) |
|---------|-------------|-------------|-------------|-------------|-------------|-------------|
| value | 25.082 V | 35.0403 kHz | | | | |
| status | ✔ | ✔ | | | | |

| Parameter | Value | Parameter | Value |
|---|---|---|---|
| $V_{in}, V_{out}$ | 25 V | $f$ | 35 kHz |
| Coil's internal dia | 117 mm | Width of the coil | 107 mm |
| Ferrite bar length | 192 mm | Ferrite bar width | 18 mm |
| Shielding plate dia | 750 mm | Number of turns | 15 |
| $L_p, L_s$ | 172 $\mu$H | $C_s, C_p$ | 120 nF |
| Air gap ($d$) | 200 mm | Load resistor ($R_L$) | 5 $\Omega$ |

FIG. 15

SYSTEMS AND METHODS FOR IMPROVING MISALIGNMENT DURING WIRELESS CHARGING

BACKGROUND

Electric vehicles (EVs) have surged in popularity in recent years as they offer a solution to the environmental problems associated with fossil fuel vehicles. Many automakers have shifted their focus towards the production of electric vehicles, leading to their widespread commercialization. However, plug-in charging of electric vehicles suffers from range anxiety and a long duration time of charging. In addition, plug-in charging methods require users to physically connect with heavy and potentially dirty chargers, which can be inconvenient. Further, this approach can be hazardous in rainy or snowy weather. Wireless power transfer (WPT) is an emerging technology appreciated for its automated, safe, and convenient characteristics, making it suitable for various conditions. These advantages have led to growing interest in wireless charging for EVs in recent years.

In a WPT charging systems, the charging process can automatically start without human intervention or interference, when the receiver installed under the chassis of the electric vehicle is aligned with the transmitter's pad, which is underground. WPT based on energy transfer can be classified as inductive power transfer (IPT) or capacitive power transfer (CPT), utilizing the magnetic field and electric field, respectively, to transfer power. CPT systems offer two benefits over IPT systems. First and foremost, CPT systems are insensitive to nearby metal objects. Second, due to using metal plates to transfer power, CPT systems are cost-efficient. However, CPT system efficiency is much lower than that of IPT systems, and it has safety issues due to the electric field emission to the environment around the coupler. Because of the mentioned reasons, IPT systems are widely used for wireless charging of EVs.

WPT for charging EVs can be classified into two groups, stationary charging and dynamic charging. In the context of stationary charging, commencing the charging process simply entails parking the vehicle above the transmitter's pad, which is installed beneath the ground. Dynamic charging enables EVs to be charged while driving, which increases the driving range and decreases the battery's weight and cost. In both technologies, misalignment is the biggest hurdle to effectively charging EVs. In dynamic charging, the misalignment gives rise to coupling variation between the receiver and the transmitter's coil, which leads to power pulsation at the battery side. Power pulsation is harmful to the battery's lifetime. Misalignment for the stationary charging scenario is even worse, which in most cases, ceases the power transfer from the primary side to the secondary side.

BRIEF SUMMARY

Embodiments of the subject invention provide novel and advantageous systems and methods for improving misalignment during wireless charging (e.g., during wireless charging of electric vehicles (EVs)). A transmitter coil can be disposed on a plate (e.g., a wheeled plate), which can act as a robot to move the transmitter. A magnetic field sensor can be installed on the transmitter pad to measure the magnetic field, and the measured magnetic field can be compared with the highest magnetic field value, with the error being sent to a controller. The controller can send a command to the robot to move the transmitter to adjust itself to be better aligned with the receiver. This can continue until the transmitter and the receiver are in a well-aligned state (e.g., a misalignment less than a predetermined tolerance, such as 1 centimeter (cm), 0.5 cm, 0.1 cm, 0.01 cm, or less). The receiver coil can be connected to a compensation network, and the compensation network can be connected to the rectifier. The rectifier can convert voltage to supply the battery.

In an embodiment, a system for improving misalignment during wireless charging (e.g., of an EV) can comprise: a plate that is configured to be mobile; a transmitter coil disposed on the plate and configured to perform wireless charging with a receiver coil; a magnetic field sensor disposed on the plate; at least one motor disposed on the plate and configured to move the plate; and a controller in operable communication with the magnetic field sensor. The controller can be configured to perform the following steps during wireless charging: i) receive, from the magnetic field sensor during wireless charging, a measurement of a magnetic field of the transmitter coil; ii) determine, based on the measurement of the magnetic field of the transmitter coil, whether the transmitter coil is in alignment with the receiver coil; iii) upon determining that the transmitter coil is in alignment with the receiver coil, send a stop signal to the plate such that the plate does not move; iv) upon determining that the transmitter coil is not in alignment with the receiver coil, send a move signal to the plate such that the at least one motor causes the plate to move; and v) repeat steps i)-iv) until the controller determines that the transmitter coil is in alignment with the receiver coil. The plate can comprise wheels (e.g., four wheels) and can act as a robot. The magnetic field sensor can be, for example, a Hall effect sensor. The system can comprise a plurality of magnetic field sensors performing the functions described herein for the one magnetic field sensor. The controller can be a microcontroller and/or a proportional-integral-derivative (PID) controller. The system can further comprise: a compensation network connected to the transmitter coil; and an inverter configured to supply a voltage (e.g., a square wave voltage) to the compensation network. The determining of whether the transmitter coil is in alignment with the receiver coil can comprise: ii-a) upon receiving the measurement of the magnetic field of the transmitter coil a first time, labeling (by the controller) the measurement of the magnetic field of the transmitter coil as a previous sensor value; ii-b) upon receiving the measurement of the magnetic field of the transmitter coil each time subsequent to the first time, after the plate has moved, labeling (by the controller) the measurement of the magnetic field of the transmitter coil as a current sensor value; ii-c) comparing (by the controller) the current sensor value to the previous sensor value; ii-d) upon the current sensor value being the same as the previous sensor value or within a predetermined tolerance value of the previous sensor value, determining (by the controller) that the transmitter coil is in alignment with the receiver coil; ii-e) upon the current sensor value being different than the previous sensor value by more than the predetermined tolerance value, determining (by the controller) that the transmitter coil is not in alignment with the receiver coil; and ii-f) relabeling (by the controller) the current sensor value as the previous sensor value. The sending of the move signal to the plate can comprise: iv-a) upon the current sensor value being less than the previous sensor value by more than the predetermined tolerance value, sending (by the controller) a first direction move signal to the plate such that the at least one motor causes the plate to move in a first direction; and iv-b) upon the current sensor value being greater than the previous sensor value by more than the predetermined tolerance value, sending (by the controller) a second direction move signal to the plate such that the at least one motor causes the plate to move in a second direction opposite to the first direction. In an alternative embodiment, the determining of whether the transmitter coil is in alignment with the receiver coil can comprise: ii-a) comparing (by the controller) the measurement of the magnetic field of the transmitter coil to a predetermined threshold value; ii-b) upon the measurement of the magnetic field of the transmitter coil being equal to the predetermined threshold value or within a predetermined tolerance value of the predetermined threshold value, determining (by the controller) that the transmitter coil is in alignment with the receiver coil; and ii-c) upon the measurement of the magnetic field of the transmitter coil being different from the predetermined threshold value by more than the predetermined tolerance value, determining (by the controller) that the transmitter coil is not in alignment with the receiver coil.

In another embodiment, a method for improving misalignment during wireless charging (e.g., of an EV) can comprise: i) providing a plate that is configured to be mobile; ii) disposing on the plate a transmitter coil that is configured to perform wireless charging with a receiver coil; iii) disposing on the plate a magnetic field sensor; iv) disposing on the plate at least one motor that is configured to move the plate; v) performing wireless charging using the transmitter coil; vi) receiving, by a controller (in operable communication with the magnetic field sensor and/or the plate), from the magnetic field sensor during the wireless charging, a measurement of a magnetic field of the transmitter coil; vii) determining, by the controller, based on the measurement of the magnetic field of the transmitter coil, whether the transmitter coil is in alignment with the receiver coil; viii) upon determining that the transmitter coil is in alignment with the receiver coil, sending, by the controller, a stop signal to the plate such that the plate does not move; ix) upon determining that the transmitter coil is not in alignment with the receiver coil, sending, by the controller, a move signal to the plate such that the at least one motor causes the plate to move; and x) repeating steps vi)-ix) until the controller determines that the transmitter coil is in alignment with the receiver coil. The plate can comprise wheels (e.g., four wheels) and can act as a robot. The magnetic field sensor can be, for example, a Hall effect sensor. The system can comprise a plurality of magnetic field sensors performing the functions described herein for the one magnetic field sensor. The controller can be a microcontroller and/or a PID controller. The method can further comprise: connecting a compensation network to the transmitter coil; connecting an inverter to the compensation network; and/or supplying, by the inverter, a voltage (e.g., a square wave voltage) to the compensation network. The determining of whether the transmitter coil is in alignment with the receiver coil can comprise: ii-a) upon receiving the measurement of the magnetic field of the transmitter coil a first time, labeling (by the controller) the measurement of the magnetic field of the transmitter coil as a previous sensor value; ii-b) upon receiving the measurement of the magnetic field of the transmitter coil each time subsequent to the first time, after the plate has moved, labeling (by the controller) the measurement of the magnetic field of the transmitter coil as a current sensor value; ii-c) comparing (by the controller) the current sensor value to the previous sensor value; ii-d) upon the current sensor value being the same as the previous sensor value or within a predetermined tolerance value of the previous sensor value, determining (by the controller) that the transmitter coil is in alignment with the receiver coil;

ii-e) upon the current sensor value being different than the previous sensor value by more than the predetermined tolerance value, determining (by the controller) that the transmitter coil is not in alignment with the receiver coil; and ii-f) relabeling (by the controller) the current sensor value as the previous sensor value. The sending of the move signal to the plate can comprise: iv-a) upon the current sensor value being less than the previous sensor value by more than the predetermined tolerance value, sending (by the controller) a first direction move signal to the plate such that the at least one motor causes the plate to move in a first direction; and iv-b) upon the current sensor value being greater than the previous sensor value by more than the predetermined tolerance value, sending (by the controller) a second direction move signal to the plate such that the at least one motor causes the plate to move in a second direction opposite to the first direction. In an alternative embodiment, the determining of whether the transmitter coil is in alignment with the receiver coil can comprise: ii-a) comparing (by the controller) the measurement of the magnetic field of the transmitter coil to a predetermined threshold value; ii-b) upon the measurement of the magnetic field of the transmitter coil being equal to the predetermined threshold value or within a predetermined tolerance value of the predetermined threshold value, determining (by the controller) that the transmitter coil is in alignment with the receiver coil; and ii-c) upon the measurement of the magnetic field of the transmitter coil being different from the predetermined threshold value by more than the predetermined tolerance value, determining (by the controller) that the transmitter coil is not in alignment with the receiver coil.

BRIEF DESCRIPTION OF DRAWINGS

FIG. 15 shows a table of coupler's dimensions and circuit specifications.

DETAILED DESCRIPTION

Figure 1:
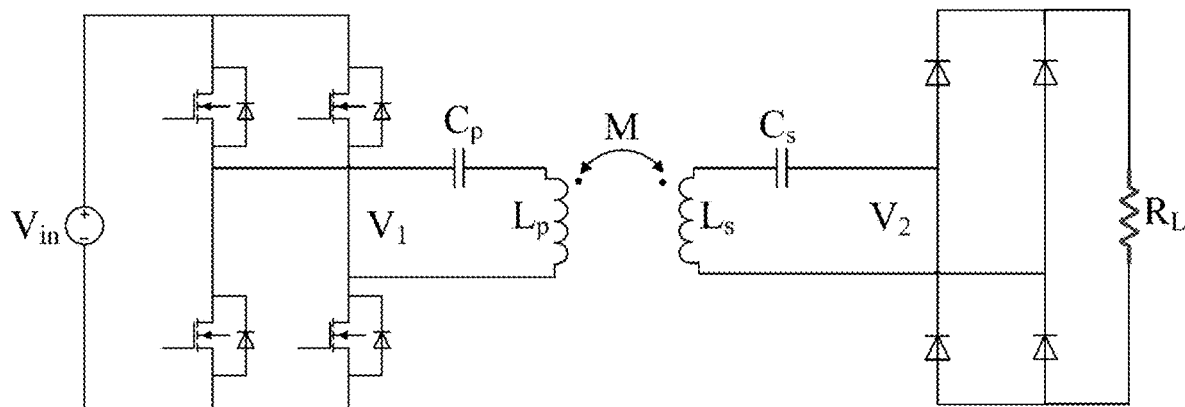
FIG. 1 shows a circuit topology of a series compensated inductive power transfer (IPT) system, according to an embodiment of the subject invention.

Embodiments of the subject invention provide novel and advantageous systems and methods for improving misalignment during wireless charging (e.g., during wireless charging of electric vehicles (EVs)). A transmitter coil can be disposed on a plate (e.g., a wheeled plate), which can act as a robot to move the transmitter. A magnetic field sensor can be installed on the transmitter pad to measure the magnetic field, and the measured magnetic field can be compared with the highest magnetic field value, with the error being sent to a controller. The controller can send a command to the robot to move the transmitter to adjust itself to be better aligned with the receiver. This can continue until the transmitter and the receiver are in a well-aligned state (e.g., a misalignment less than a predetermined tolerance, such as 1 centimeter (cm), 0.5 cm, 0.1 cm, 0.01 cm, or less). The receiver coil can be connected to a compensation network, and the compensation network can be connected to the rectifier. The rectifier can convert voltage to supply the battery.

In the wireless charging of electric vehicles, related art systems focus on coil design and controllers to attempt to improve misalignment performance. The related art does not consider a movable transmitter to follow the receiver to adjust alignment is. In order to improve misalignment performance, embodiments of the subject invention can include a movable transmitter, in which the transmitter pad can be mounted on a plate, such as a plate having wheels (e.g., a four-wheeled plate, which may have a rectangular or square shape). The plate can perform as a robot to move the transmitter. A magnetic field sensor can be installed on the transmitter pad, which follows the highest magnetic field. The highest magnetic field is in the well-aligned case, in which the transmitter and receiver are well-aligned (e.g., misalignment of less than 0.5 cm, such as 0 cm or less than 0.1 cm). In this case, if misalignment is present (e.g., of greater than a predetermined threshold, such as 0.01 cm, 0.1 cm, or 0.5 cm), the transmitter pad can move to remove the misalignment and create a well-aligned state. In other words, the transmitter can follow the receiver to remove misalignment. A limited area can be defined so that the transmitter pad can move within this limited area.

In many embodiments, a system can include an inverter at the input side for producing a square wave voltage, which can supply the compensation network. The compensation network can be connected with a transmitter pad, which can be mounted on a plate, such as a plate having wheels (e.g., a four-wheeled plate, which may have a rectangular or square shape). A magnetic field sensor can be installed on the transmitter pad to measure the magnetic field, and the measured magnetic field can be compared with the highest magnetic field value, which occurred in the well-aligned state. The error can then go to a controller (e.g., a proportional-integral-derivative (PID) controller), which can send a command to the plate (e.g., to the wheels of the plate) to move the transmitter pad towards the highest magnetic field (i.e., well-aligned state). In this way, whenever a misalignment occurs, and no matter if it is horizontal or vertical, the transmitter moves to align itself with the receiver pad (i.e., moves to the well-aligned state). The receiver coupler can be connected with a compensation network, and the compensation network can be connected with a rectifier to convert alternating current (AC) voltage to direct current (DC) voltage to supply a battery of an electric vehicle. The controller can comprise a processor and can have one or more modules (e.g., software modules) stored thereon (e.g., on one or more machine-readable media) for performing the steps necessary to move the transmitter coil to a well-aligned state with the receiver coil.

Embodiments of the subject invention are effective at correction of both horizontal (i.e., lateral) and vertical misalignment. As the transmitter follows the receiver movement, the transmitter can adjust itself with the receiver in both lateral and vertical misalignment. Embodiments are also effective at correction of large misalignment. Because the controller (e.g., PID controller) sends commands to the wheels of the transmitter's robot (i.e., to the plate) to follow the highest magnetic field value, then regardless of how much misalignment exists, the transmitter can move to a well-aligned state with the receiver.

Figure 6:
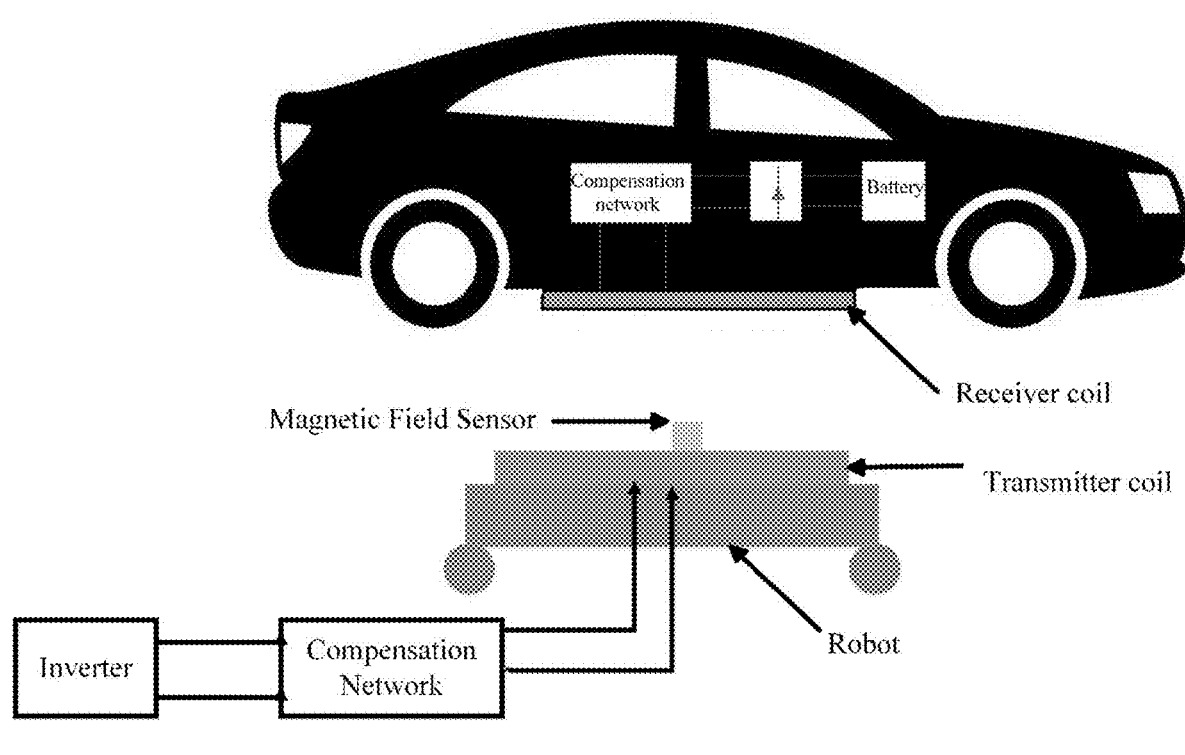
FIG. 6 shows the structure of an autonomous alignment system, according to an embodiment of the subject invention.
Figures 7A, 7B:
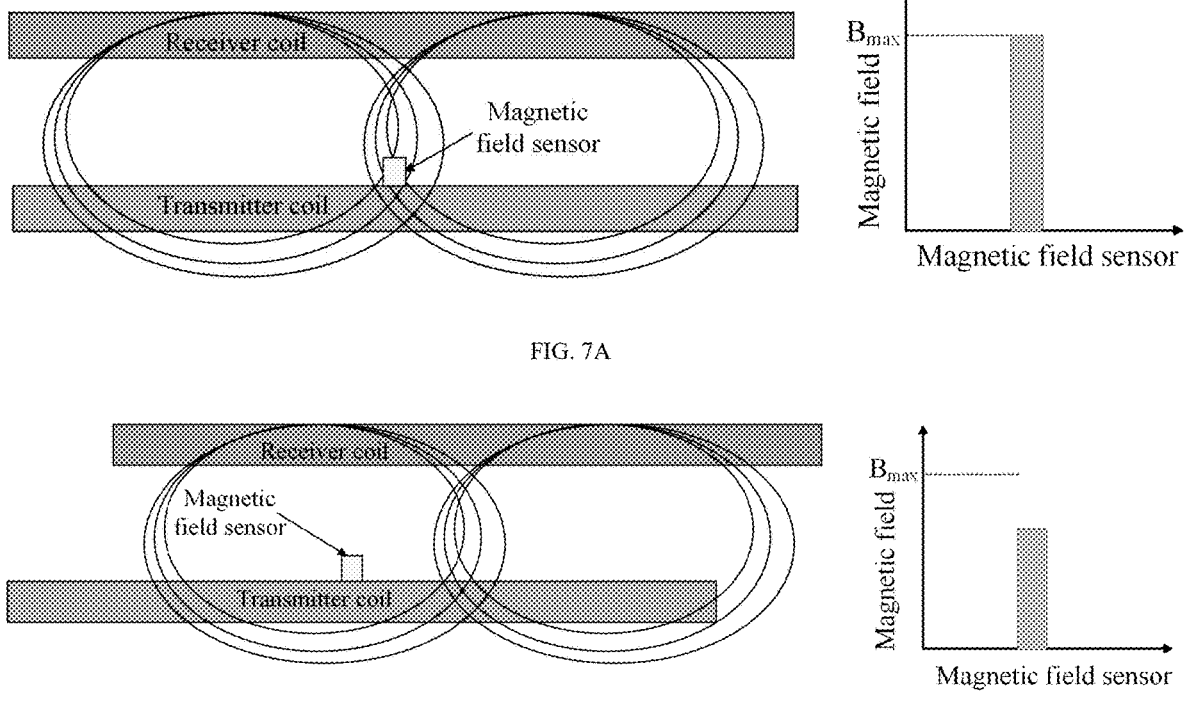
FIG. 7A shows the interaction between the magnetic field sensor and the magnetic flux generated by the receiver coil at well-aligned conditions.
FIG. 7B shows the interaction between the magnetic field sensor and the magnetic flux generated by the receiver coil at a 5 cm misalignment.
Figure 7C:
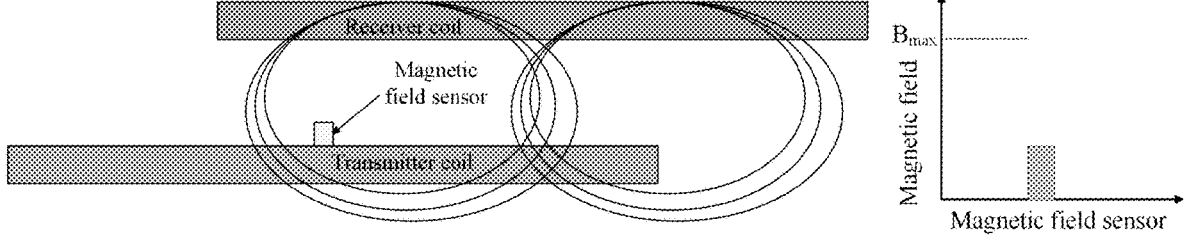
FIG. 7C shows the interaction between the magnetic field sensor and the magnetic flux generated by the receiver coil at a 10 cm misalignment.
Figure 7D:
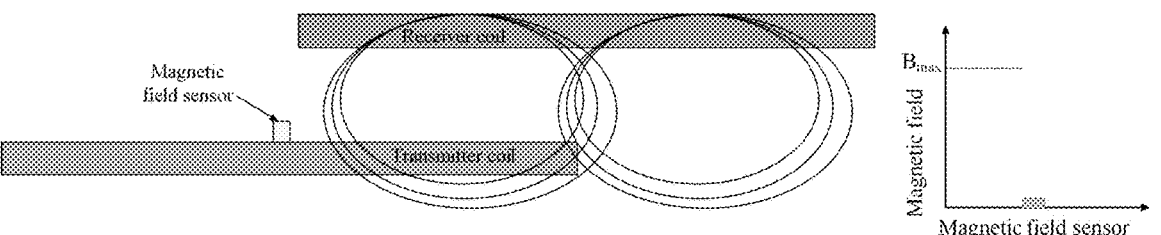
FIG. 7D shows the interaction between the magnetic field sensor and the magnetic flux generated by the receiver coil at a 15 cm misalignment.

FIG. 6 shows the structure of an autonomous alignment system, according to an embodiment of the subject invention. Referring to FIG. 6, the transmitter coil can be disposed on (e.g., mounted on) a plate (e.g., a wheeled plate, such as a four-wheeled square plate), which can act as a robot to move the transmitter. A magnetic field sensor can be installed on the transmitter pad to measure the magnetic field. The measured magnetic field can be compared with the highest magnetic field value, with the error being sent to a controller (e.g., a PID controller). The controller can send a command to the robot to move the transmitter to adjust itself to be better aligned with the receiver. The receiver coil can be connected to the compensation network, and the compensation network can be connected to the rectifier. The rectifier can convert AC voltage to DC voltage to supply the battery.

In wireless power transfer (WPT) systems, maintaining proper alignment is a significant issue depending on standards and guidelines. When the transmitting and receiving coils are not properly aligned, it can lead to problems such as increased flux leakage and reduced mutual inductance, resulting in a drop in transfer efficiency. This is especially critical in high-power systems, where even minor misalignment can lead to substantial power losses. Therefore, it is crucial to address misalignment to ensure and optimize efficiency. It is difficult to align the transmitter and receiver coils perfectly in stationary charging of EVs as it relies on the driver, vehicle, and the environment. The fluctuation might be vertical, lateral, rotational, or angular. Based on the SAE J2954 standard, WPT systems for charging EVs should have the characteristic of misalignment tolerance in both horizontal and vertical directions to some extent. Attempts to decrease the impact of misalignment can include modifying the coil and core structure and dimension. Circular and rectangular pads may be adopted due to their simplicity and minimal required components, leading to a decrease in the usage of copper winding. However, these configurations exhibit poor performance characterized by low coupling coefficients and limited tolerance for misalignment. A further attempt to improve misalignment performance could include a DD coil structure, a Q coil, a bipolar pad, or a tripolar power pad (TPP) can be used (see also; Song et al., Design of dd coil with high misalignment tolerance and low emf emissions for wireless electric vehicle charging systems, IEEE Transactions on Power Electronics, vol. 35, no. 9, pp. 9034-9045, 2020; Domajnko and Prosen, A wireless power transfer system using a double dd quadrature coil structure, Electronics, vol. 12, no. 4, p. 890, 2023; Rasekh et al., A novel integration method for a bipolar receiver pad using 1 cc compensation topology for wireless power transfer, IEEE Transactions on Vehicular Technology, vol. 67, no. 8, pp. 7419-7428, 2018; and Mosammam and Mirsalim, New integrated tripolar pad using double-sided 1 cc compensation for wireless power transfer, IEEE Transactions on Vehicular Technology, vol. 69, no. 12, pp. 15 633-15 643, 2020; all four of which are hereby incorporated by reference herein in their entireties).

Integrating the compensation inductor with the main coil, due to cross coupling arising from magnetic integration, can boost the misalignment tolerance. Besides integrating the compensation inductor into the main coil magnetically, incorporating magnetic integration of the reverse coil can also help mitigate mutual inductance variations caused by misalignment in IPT systems. Metamaterials can also be part of an attempt to improve misalignment performance. Metamaterials, being artificial constructs, possess unique features such as negative refraction due to their organized periodic structure. Metamaterials, owing to their distinctive electromagnetic properties, can enhance the distribution of the magnetic field around the receiver, improve the coupling between coils, and increase the efficiency of a WPT system.

Misalignment of the magnetic couplers can cause the coupling coefficient to deviate from the nominal value, which affects the system's efficiency, output power, input phase angle, and input impedance. Thus, it is crucial to appropriately design the compensation network to maintain efficiency as high as possible and to reduce the sensitivity to the coupling variation. Four basic compensation networks, such as Series-Parallel (S-P), Parallel-Series (P-S), Series-Series (S-S), and Parallel-Parallel (P-P), are not appropriate for working under misalignment as they are highly susceptible to misalignment. The S-S compensation topology is commonly employed as a general compensation network in EV wireless charging due to its resonance frequency independence from coupling and load conditions. An inductor-capacitor-capacitor (LCC) compensation network can be part of an attempt to improve misalignment tolerance, which not only keeps the resonant frequency independent of coupling coefficients and load conditions but also ensures high efficiency by operating in a zero-current switching state, maintaining stable performance even in cases of misalignment.

Hybrid topologies incorporate the advantages of each topology and provide a system that is resilient to changes in the coupling coefficient. A hybrid topology, merging aspects of both S-S and inductor-capacitor-capacitor-parallel (LCC-P) configurations, can improve tolerance to misalignment. Both the S-S and LCC-P topologies yield constant-current output. However, they exhibit opposite behaviors in response to misalignment; therefore, by integrating these two topologies, it becomes feasible to enhance the system's misalignment tolerance.

Generally, the control strategies to cope with the misalignment issue can be divided into three categories: primary side control; secondary side control; and dual side control. The goal of primary side control is to reduce the size and cost of the secondary side, and wireless communication is required to send data from the secondary side to the primary side for the controller. Wireless communication is prone to delay and inaccuracy, which affects the operation of the controller. The primary side control can be realized by controlling the inverter or controlling an additional DC-DC converter added to the primary side. Many primary side control techniques rely on wireless communication modules, including but not limited to Wi-Fi and Bluetooth. The advantage of the secondary side control is that it does not require communication, which is simple and robust. However, it requires an additional circuit at the secondary side installed under the chassis of the electric vehicle, which increases the weight and cost of electric vehicles. The secondary side control to address the misalignment can be realized by controlling the rectifier or controlling the additional DC-DC converter at the secondary side. Dual-side control is a control scheme that controls both sides at the same time, which increases the complexity.

Related art attempts to address the misalignment issue is limited to a small range of misalignment while in the real world, misalignment occurs at a much higher level for which related arty systems and methods are inefficient for high misalignment. The related art includes no self-aligning mechanism that is effective in aligning the transmitter coil to the receiver automatically in every misalignment condition, no matter how much misalignment occurs. The lack of such aligning mechanisms in the literature provided motivation for the development of embodiments of the subject invention to provide a novel autonomous self-aligning system to address a wide range of misalignments in the stationary charging of EVs. The autonomous self-aligning mechanism can be achieved by using a robot to align the transmitter coil to the receiver with the assistance of a magnetic field sensor to detect the magnetic field.

FIG. 1 shows the circuit topology of a series compensated IPT system, according to an embodiment of the subject invention, in which a full-bridge inverter at the primary side fed the inductive coil through a compensation network. The compensation network can be used to minimize reactive power to improve efficiency. The power can be transferred from the transmitter coil to the receiver coil through the magnetic field. A rectifier can be used at the secondary side to convert AC to DC to supply the battery.

Figure 2A:
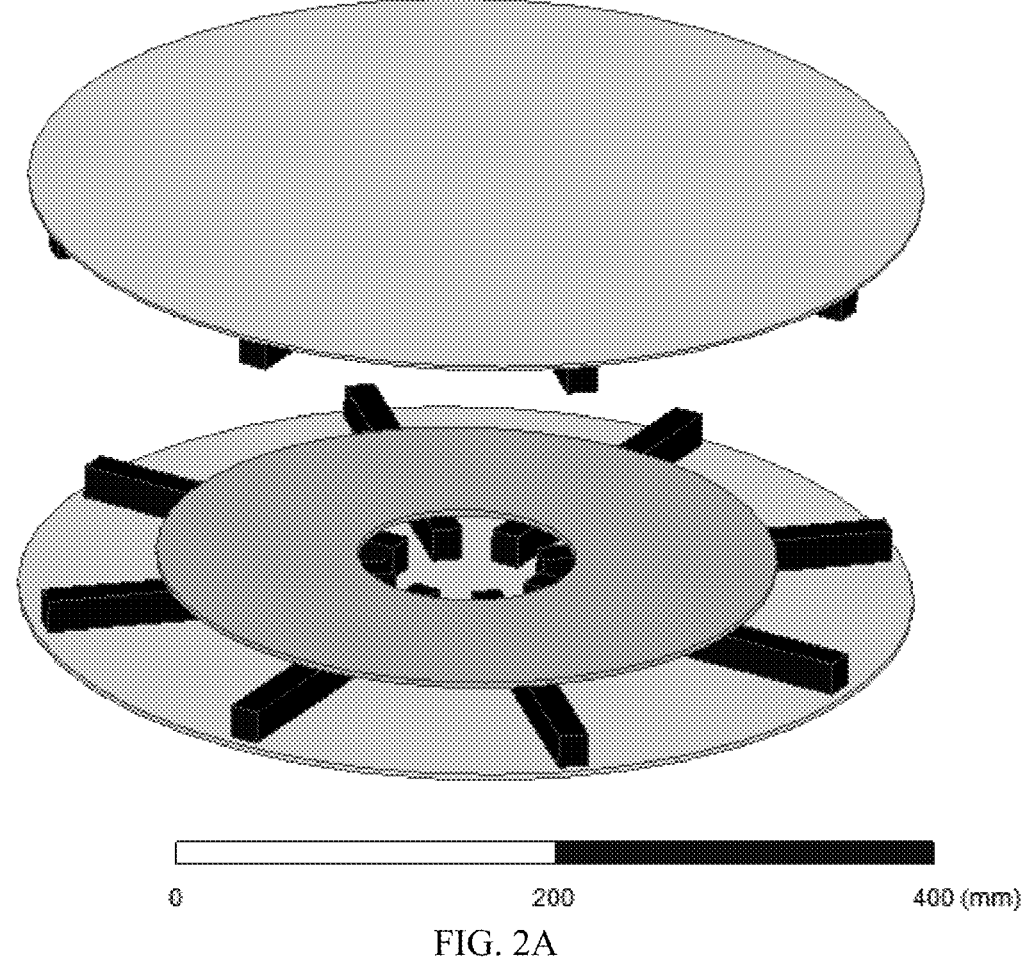
FIG. 2A shows a three-dimensional (3D) view of a coil structure that can be used with embodiments of the subject invention.
Figure 2B:
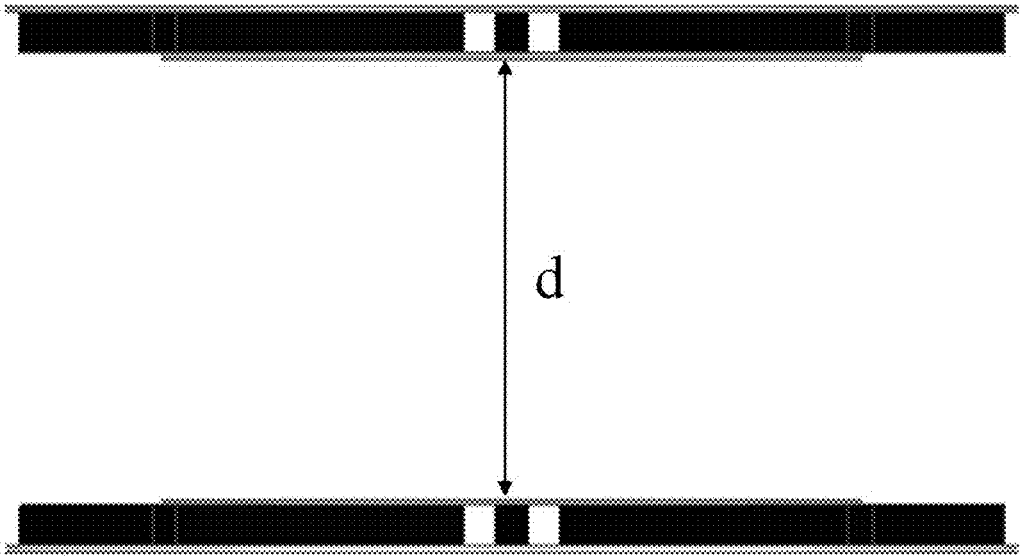
FIG. 2B shows a front view of the coil from FIG. 2A.

FIGS. 2A and 2B show the coil structure, which is a circular pad. Metal (e.g., ferrite) bars can be used at the transmitter and receiver sides to improve the coupling coefficient. Metal (e.g., aluminum) plates can be used on both sides for the purpose of shielding. The magnetic field in the center of the air gap at the well-aligned can be calculated as follows:

$$B = \frac{\mu_0 N I R^2}{2}\left(\frac{1}{\sqrt{R^2 + \left(z - \frac{d^2}{8}\right)^2}} + \frac{1}{\sqrt{R^2 + \left(z + \frac{d^2}{8}\right)^2}}\right) \quad (1)$$

where N is the number of turns, I is the current, R is the radius of the circular pad, and d is the air gap. When there is misalignment in the y direction as a length of $d_y$, the magnetic field at the center of the air gap is described as follows:

$$B = \frac{\mu_0 N I R^2}{2}\left(\frac{1}{\sqrt{R^2 + \left(z - \frac{d^2}{8}\right)^2}} + \frac{1}{\sqrt{R^2 + \left(z + \frac{\sqrt{d^2/4 + d_y^2}^2}{4}\right)^2}}\right) \quad (2)$$

According to Equation 2, the magnetic field strength in the mid-point between transmitter and receiver is decreased by increasing misalignment ($d_y$). The mutual inductance between transmitter and receiver at misalignment can be calculated as follows:

$$M = \frac{\mu_0 \pi N^2 R^2}{2}\left(\frac{1}{\sqrt{R^2 + \left(z - \frac{d^2}{8}\right)^2}} + \frac{1}{\sqrt{R^2 + \left(z + \frac{\sqrt{d^2/4 + d_y^2}^2}{4}\right)^2}}\right) \quad (3)$$

The primary current is derived as follows:

$$i_p = \frac{j\omega L_s + R_s + \frac{1}{j\omega C_s} V_{in}}{\left(R_p + \frac{1}{j\omega C_p} + j\omega L_p\right)\left(j\omega L_s + R_s + \frac{1}{j\omega C_s}\right) + \omega^2 M^2} \quad (4)$$

The output power and efficiency for a S-S compensated IPT system is expressed as follows:

$$P = R_{ac}\left[\frac{\omega M V_{in}}{\left(R_p + j\omega L_p + \frac{1}{j\omega C_p}\right)\cdot\left(R_{ac} + R_s + j\omega L_s + \frac{1}{j\omega C_s}\right) + (\omega M)^2}\right]^2 \quad (5)$$

$$\eta = \frac{R_{ac}}{R_{ac} + R_s + R_p\left(\frac{R_{ac} + R_s + j\omega L_s + \frac{1}{j\omega C_s}}{\omega^2 M^2}\right)} \quad (6)$$

where Rp and Rs are the resistance of the transmitter and receiver coil, respectively, and $$R_{ac} = \frac{8}{\pi^2} R_L.$$

As misalignment between transmitter and receiver start to increase, the mutual inductance starts to decrease, leading to a drop in the efficiency. In other words, increasing misalignment gives rise to higher power losses in the IPT system. The total losses in the IPT system primarily comprise three parts: losses in the inverters; losses in the transmitter and receiver coils; and losses in the rectifiers. The losses of the primary inverter mainly include conduction losses and switching losses of metal oxide semiconductor field effect transistors (MOSFETs), which can be calculated as follows:

$$P_{con,loss} = \frac{r_{ds}}{\pi}(i_{p,rms}^2 + i_{a,rms}^2)(\pi + \theta + \sin(\theta)) \quad (7)$$

$$P_{sw,loss} = 2V_{in}(i_{p,rms} + i_{a,rms})\sqrt{2}\cos\left(\frac{\theta}{2}\right)f\left(\frac{e_{sw,on} + e_{sw,off}}{V_R I_R}\right)$$

$$P_{inv,loss} = P_{con,loss} + P_{sw,loss}$$

where $e_{sw,on}$, $e_{sw,off}$, $V_R$, $I_R$, and $r_{ds}$ are the turn-on losses, turn-off losses, drain-source voltage, drain-source current, and on-state resistance of primary inverter MOSFETs. According to Equation 4, a reduction in mutual inductance results in an increase in primary current, and in accordance with Equation 7, this causes a rise in power losses in the MOSFETs.

Inductive coupler losses comprise two main parts, copper losses ($P_{cu}$) and ferrite losses ($P_{fe}$). Copper losses include losses due to skin effects ($P_{se}$) and losses due to proximity effects ($P_{pe}$), which are expressed as follows:

$$P_{se} = n_{st} R_{dc} F_R(f)\left(\frac{I_{peak}}{n_{st}}\right)^2 \quad (8)$$

$$P_{pe} = n_{st} R_{dc} G_R(f)\left(H_e^2 + \frac{I_{peak}^2}{2\pi^2 d_a^2}\right)$$

$$P_{cu} = P_{se} + P_{pe}$$

$$P_{fe} = k_s f^\alpha B^\beta$$

where $n_{st}$ represents the number of strands in the Litz wire, and $R_{dc}$ denotes the DC resistance per unit length of a single strand of the Litz wire. $I_{peak}$ stands for the transmitter's peak current, and $F_R(f)$ is a frequency-dependent factor accounting for the skin effect. The symbol $d_a$ corresponds to the outer diameter of an individual strand of the Litz wire, $G_R(f)$ illustrates a frequency-dependent factor reflecting proximity effects, and $H_e$ represents the external magnetic field that penetrates the windings. The symbols $k_s$, $\alpha$, and $\beta$ are Steinmetz parameters. The power loss in the rectifier can be calculated as follows:

$$P_{rec,loss} = \frac{2\sqrt{2}}{\pi} V_f i_s + r_D i_s^2 \qquad (9)$$

Figure 3A:
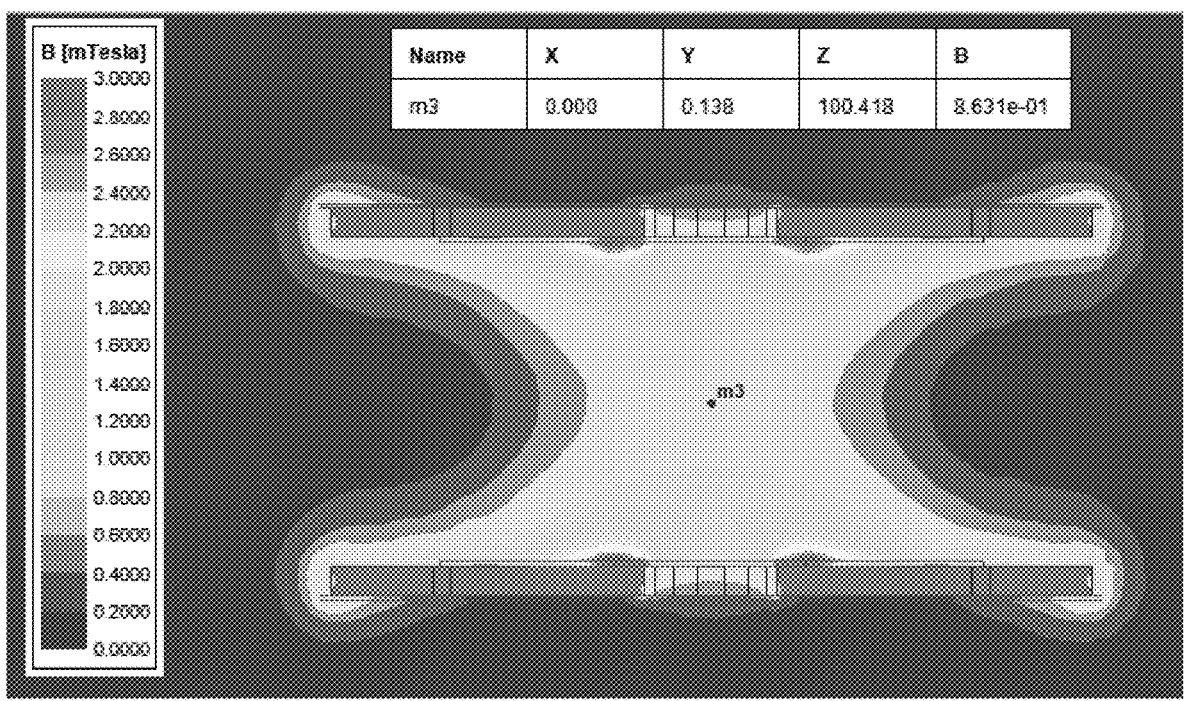
FIG. 3A shows a magnetic field distribution of a coil that can be used with embodiments of the subject invention, with a well-aligned alignment.
Figure 3B:
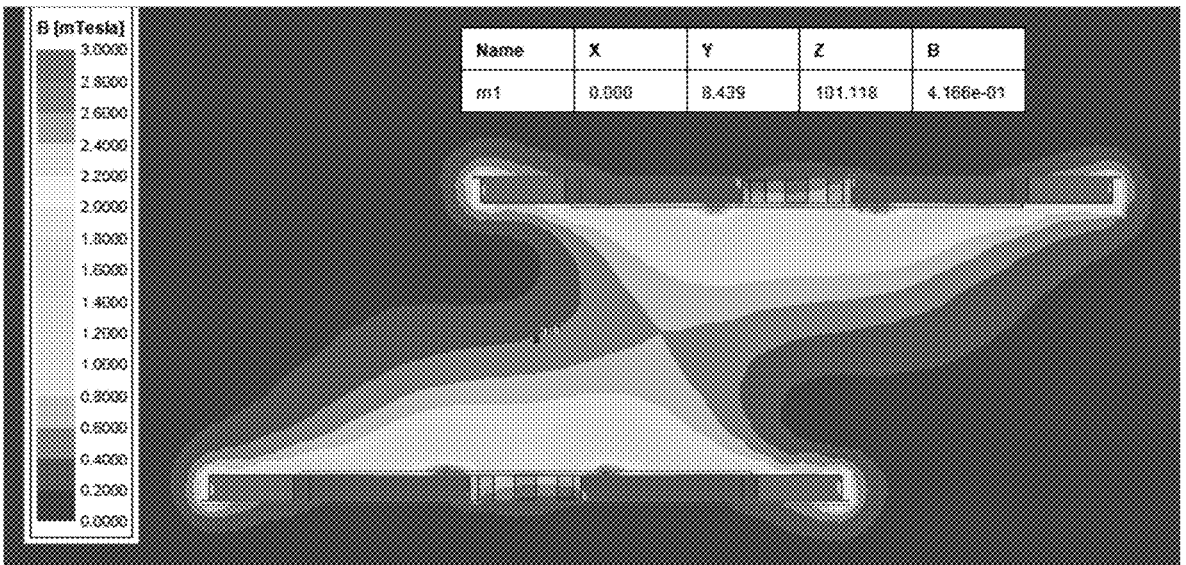
FIG. 3B a magnetic field distribution of a coil that can be used with embodiments of the subject invention, with a 20 centimeter (cm) misalignment.

As shown in FIGS. 3A and 3B, when the transmitter coil is well-aligned with the receiver coil, the magnetic field strength at the midpoint between the transmitter and receiver is 0.8 milliTesla (mT), while at the 20 cm misalignment, the magnetic field strength at the mid-point between the transmitter and receiver is half of the magnetic field value for the well-aligned case. This proves that the misalignment gives rise to a reduction in magnetic field strength at the air gap between the transmitter and receiver coils.

Figure 4A:
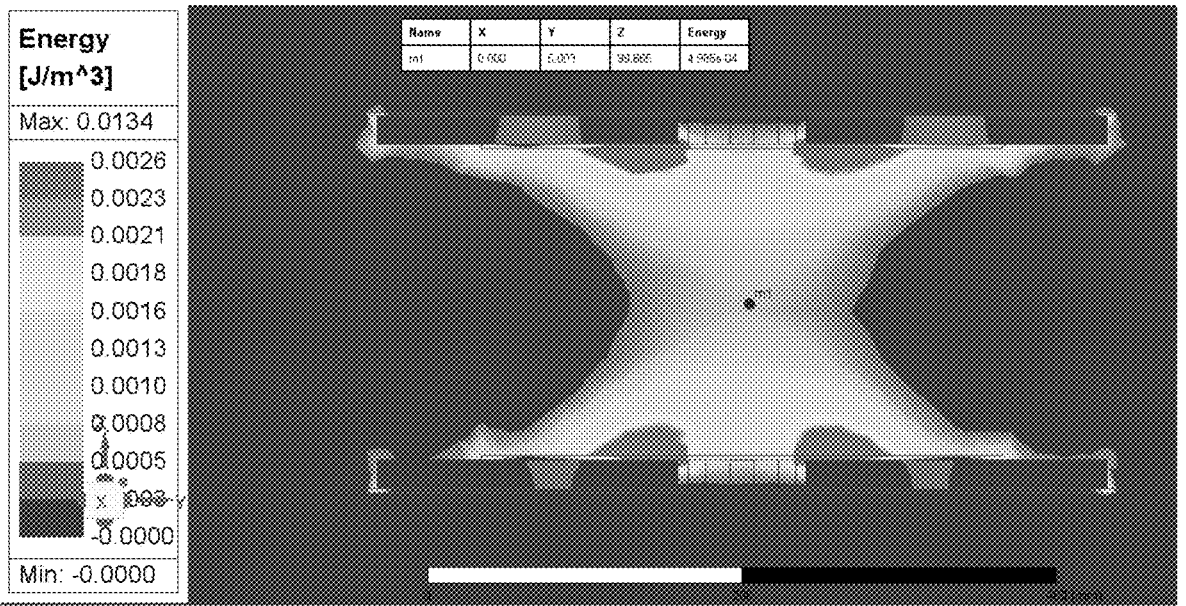
FIG. 4A shows an energy distribution of a coil that can be used with embodiments of the subject invention, with a well-aligned alignment.
Figure 4B:
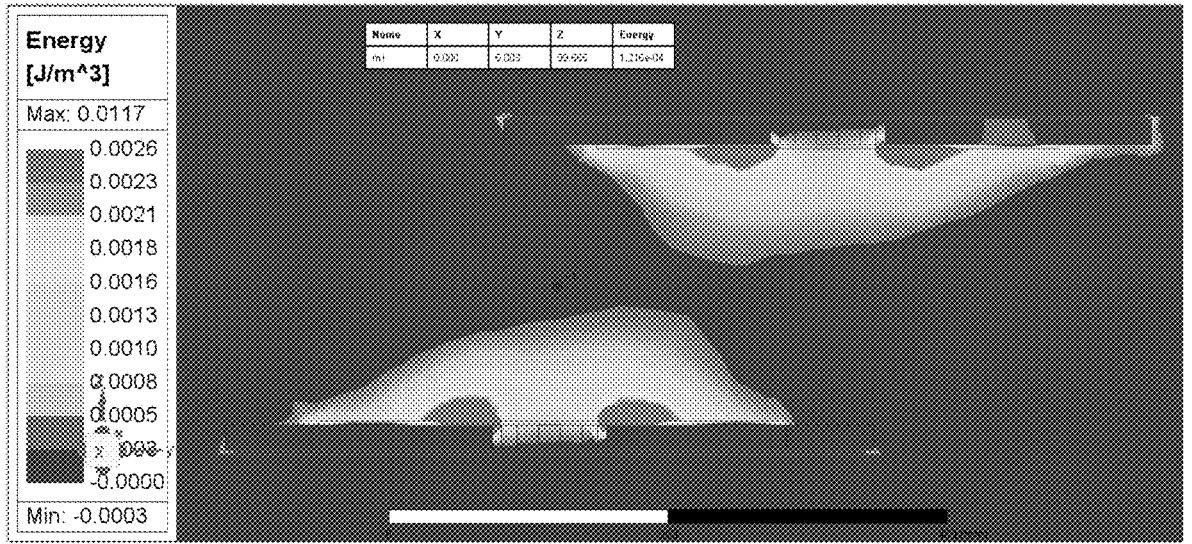
FIG. 4B shows an energy distribution of a coil that can be used with embodiments of the subject invention, with a 20 cm misalignment.

FIGS. 4A and 4B show the energy distribution between transmitter and receiver coils at a well-aligned state and for a 20 cm misalignment case. FIGS. 4A and 4B verify that the misalignment causes a decrease in energy transfer between the transmitter and receiver pads.

Figure 5:
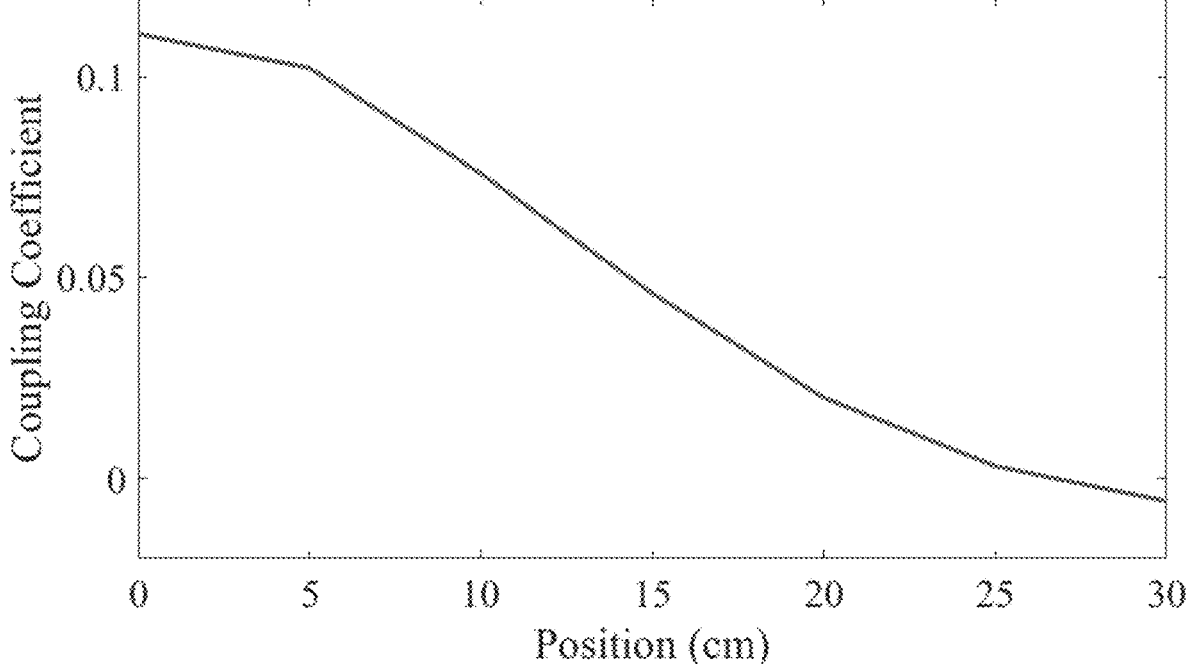
FIG. 5 shows a plot of coupling coefficient versus position (in cm), showing the coupling coefficient between transmitter and receiver at different misalignment values.

FIG. 5 shows the coupling coefficient between the transmitter and receiver in different misalignments. As shown in FIG. 5, the misalignment gives rise to a significant reduction in the coupling coefficient, in which at 25 cm misalignment, the coupling coefficient reaches zero.

In order to improve the misalignment performance, embodiments of the subject invention provide systems and methods for autonomous self-alignment during wireless charging (e.g., of an EV), in which the transmitter pad is mounted on a robot to follow the receiver pad. A magnetic field sensor can be installed on the transmitter pad, which can follow the highest magnetic field value. The highest magnetic field is in the well-aligned case, where the transmitter and receiver are well-aligned. In this case, by having misalignment, the transmitter pad moves to remove misalignment and create alignment. In other words, the transmitter follows the receiver to remove misalignment (see also FIG. 6).

FIGS. 7A-7D show the interaction between the magnetic field sensor and the magnetic flux generated by the receiver pad at different misalignment conditions. Referring to FIGS. 7A-7D, it is evident that the sensor measures the highest magnetic field at the well-aligned state, and by increasing the misalignment, the magnetic field decreases.

The robot should be configured such that it can tolerate the weight of the transmitter coil without affecting the speed and movement of the robot. The chassis of the robot can be made with a strong rigid material, such as steel (e.g., galvanized steel). In an embodiment, the robot can include a galvanized steel frame that goes around in an octagonal shape. This frame is strong enough to support the transmitter coil and is a solid foundation for all the other parts that would be implemented. The frame can then be supported additionally by another bar in the middle that contributes to better stability and strength. This bar (e.g., steel bar) can also hold the motor(s) (e.g., 12 Volt (V) motors with high torque). Because of the torque, the frame can handle a large amount of weight. The wheels can be any suitable size (e.g., 4-inch wheels), and in some embodiments, the platform (or plate) can be configured to hold at least 35 pounds without breaking or limiting its movement on the wheels.

The frame can support a platform, which may be made of a rigid material (e.g., a lightweight rigid materials, such as polyvinyl chloride (PVC)). The platform can hold the transmitter coil and the magnetic field sensor. Underneath the platform, a second platform, which may be made of a rigid material (e.g., a lightweight rigid materials, such as PVC), can be disposed and can house other components (e.g., battery packs and microcontrollers). The frame can be supported by wheels. For example, in an embodiment, the frame is supported by two wheels powered by 12 V motors and four caster wheels. The caster wheels give the flexibility to move and allow for good stability while providing a firm foundation. This chassis is very strong and durable while having the space and strength to hold the transmitter coil and all other components. The overall chassis weighed around 30 pounds with the transmitter coil.

Figure 8:
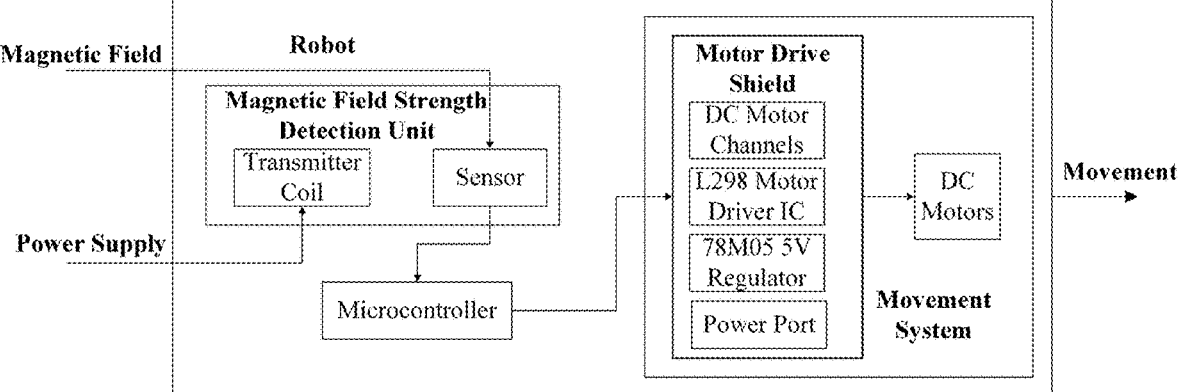
FIG. 8 shows a block diagram of an autonomous self-aligning system, according to an embodiment of the subject invention.

FIG. 8 shows a block diagram of an autonomous self-aligning mechanism, according to an embodiment of the subject invention. The entire system can take in two inputs and have one output. An existing magnetic field can be taken as an input to the magnetic field strength detection unit. The transmitter coil within the detection unit can use its own power supply to contribute to the strength of the existing magnetic field. The microcontroller can receive magnetic field strength values from the sensor (e.g., Hall effect sensor), which it can then use to perform calculations and logic on those values and output motor instructions. Because the motor(s) cannot understand these instructions, the motor shield can serve as the interface that translates these instructions for the motor(s) to adjust the chassis position accordingly.

The autonomous self-aligning mechanism can include a highly specialized algorithm that is specifically designed to control the EV wireless charging alignment system. The algorithm can be critical in aligning the transmitter coil to the receiver coil to maximize the power transfer. The algorithm's unique and complex nature demands exceptional attention and understanding to ensure the effective functioning of the charging device. The concept for the algorithm is designed to be as straightforward as possible to follow a test-driven development (TDD) and agile approach, even though no test harnesses were used in conglomeration with the Arduino integrated development environment (IDE).

Figure 9:
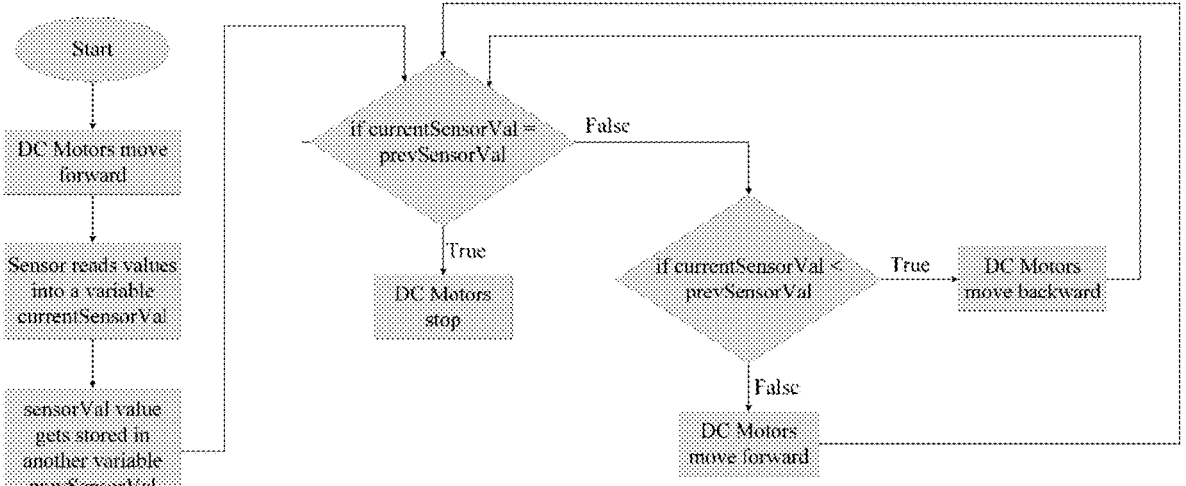
FIG. 9 shows a flowchart of a forward single-axis algorithm, according to an embodiment of the subject invention.

For realizing an autonomous self-aligning mechanism, a forward single-axis algorithm can be used and was tested in the laboratory setting. This algorithm, when powered on, tells the motor(s) to move forward. The alignment system will then move forward until a hardcoded setpoint value is received from the sensor. When the microcontroller gets the setpoint value from the sensor, it will tell the motors to stop. This may only go in one direction (e.g., the y direction). FIG. 9 shows a flow chart of the algorithm. In an embodiment, two 12 V motors were fitted onto the sides to propel the chassis in the desired direction. These motors were connected to the 3A L298N motor drive shield. The motor drive shield is robust enough to support the battery pack that powers the motors. The motor shield also allows for better controllability of the individual motors by providing individual settings for the direction and speed of each motor. This motor drive shield can take power from the battery pack and power the motor.

The motor drive shield can receive get instructions from the controller (e.g., microcontroller, such as Arduino Mega 2560 microcontroller) to move the motor(s) according to the implemented algorithm. The controller is more than capable of executing the instructions that is given to it. Because the controller can be a larger controller, it can have the space to accommodate for additional features that may be desired to be implemented, such as more sensors.

The controller can process logic based on the sensor values that are obtained through the sensor (e.g., Hall effect sensor) that is attached to the top of the alignment system. The sensor can be able to read the values from the magnetic field that the coils produce and accurately give those values to the controller to use.

Embodiments of the subject invention provide a focused technical solution to the focused technical problem of how to address inefficient misalignment during wireless charging (e.g., of an EV). The solution is provided by disposing the transmitter coil on a mobile plate with a magnetic field sensor, and using a controller to determine whether the transmitter coil is in a well-aligned state with the receiver coil based on measurements from the magnetic field sensor. If the transmitter coil is not in a well-aligned state with the receiver coil, then the plate moves based on directions/signals from the controller and this process continues until the controller determines that the transmitter coil is in a well-aligned state with the receiver coil. This plainly has the practical application of significantly improving the efficiency of wireless charging by automatically (without human intervention or interference) moving a transmitter coil until a well-aligned state (with the receiver coil) is achieved.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

When the term module is used herein, it can refer to software and/or one or more algorithms to perform the function of the module; alternatively, the term module can refer to a physical device configured to perform the function of the module (e.g., by having software and/or one or more algorithms stored thereon).

When ranges are used herein, combinations and subcombinations of ranges (including any value or subrange contained therein) are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

EXAMPLE 1

After designing the coupler, the circuit parameters were tuned for realizing resonance at the frequency of 35 kilohertz (kHz). The table in FIG. 15 shows the coupler's dimensions and the circuit specifications. Using the parameters in the table in FIG. 15, a prototype of the system was constructed.

Figure 10:
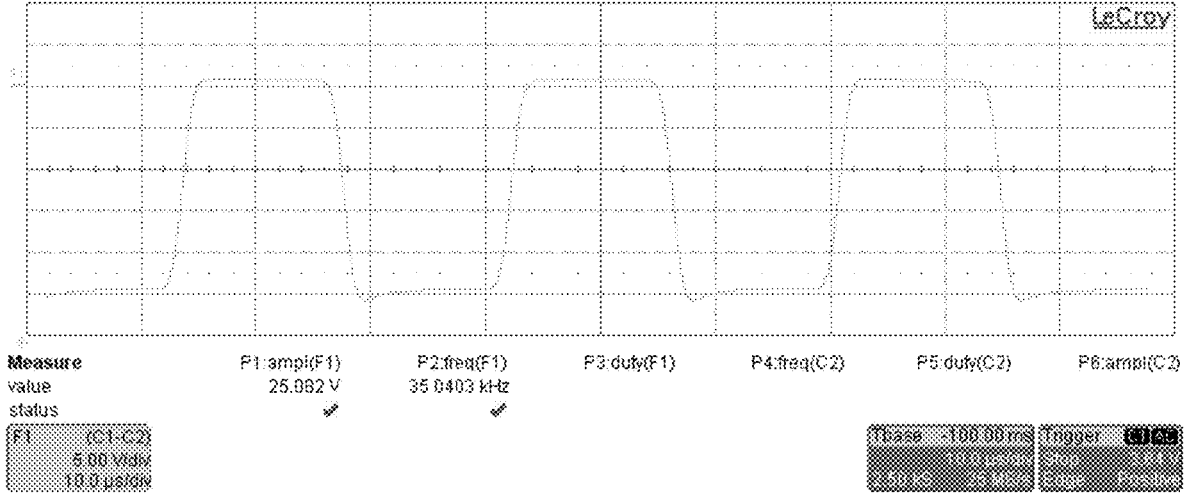
FIG. 10 shows a plot of output voltage of IPT.
Figures 11A, 11B, 11C, 11D:
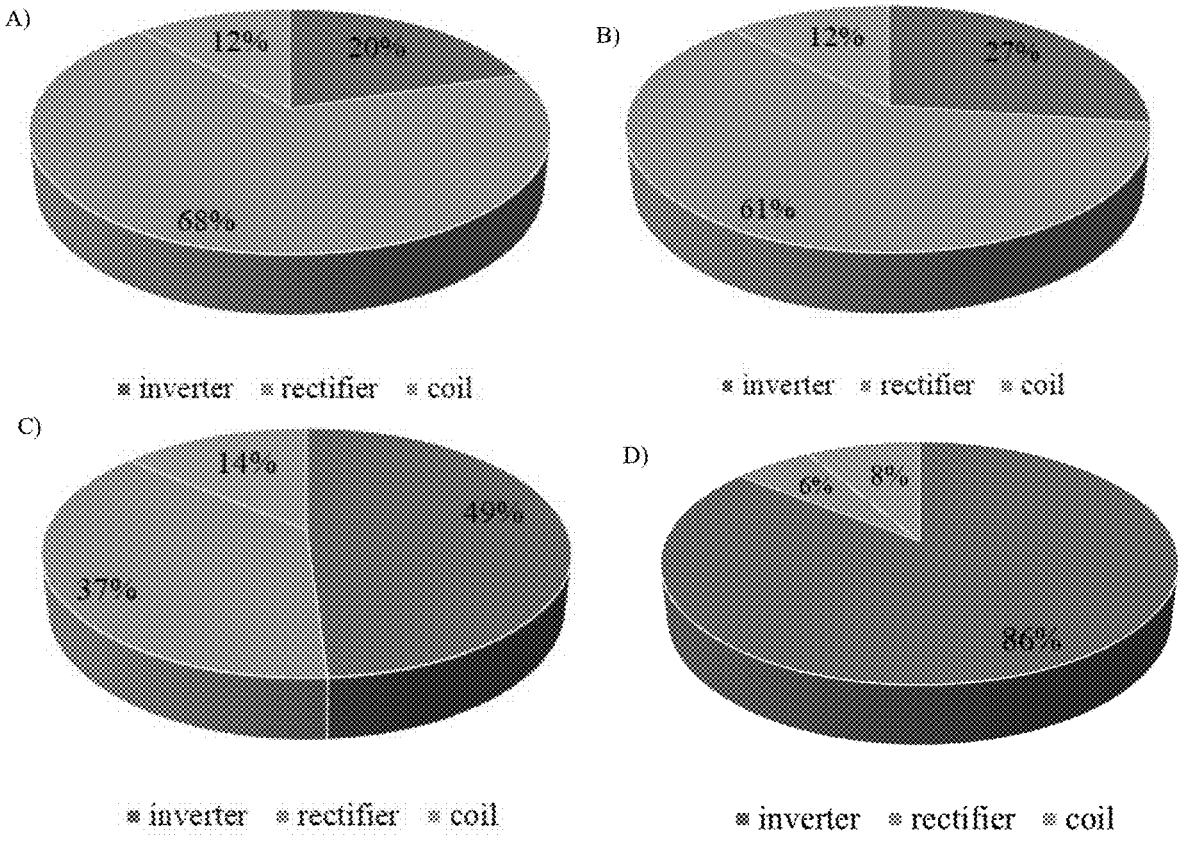
FIG. 11A shows a pie chart of power losses generated at well-aligned conditions. The losses from rectifier, inverter, and coil are 68%, 20%, and 12%, respectively.
FIG. 11B shows a pie chart of power losses generated at a 5 cm misalignment. The losses from rectifier, inverter, and coil are 61%, 27%, and 12%, respectively.
FIG. 11C shows a pie chart of power losses generated at a 10 cm misalignment. The losses from rectifier, inverter, and coil are 37%, 49%, and 14%, respectively.
FIG. 11D shows a pie chart of power losses generated at a 15 cm misalignment. The losses from rectifier, inverter, and coil are 6%, 86%, and 8%, respectively.

The transmitter and receiver coil included AWG 36 Litz wire to minimize skin effect losses. For the implementation of the input inverter, silicon-carbide (SiC) MOSFETs C2M0025120D were utilized to minimize conduction losses. A Texas Instruments TMS320F28379D digital microcontroller was used for the generation of the pulse wave modulation (PWM) signals of the MOSFETs. The digital microcontroller had the advantage of being convenient in adjusting the frequency and dead time for the full-bridge inverter. The dead time was selected to be 100 nanoseconds (ns). FIG. 10 shows the output voltage of the inductive power transfer.

FIGS. 11A-11D display the power loss percentages associated with three contributing parts in power loss generation. It can be seen that increasing misalignment leads to a greater dominance of inverter losses in overall power loss. This shift towards increased inverter losses is because inverter losses are directly proportional to the square of the primary current, as indicated in Equation 7. Misalignment causes a rise in primary current, as demonstrated in Equation 4, thereby causing higher losses in the inverter.

Figure 12:
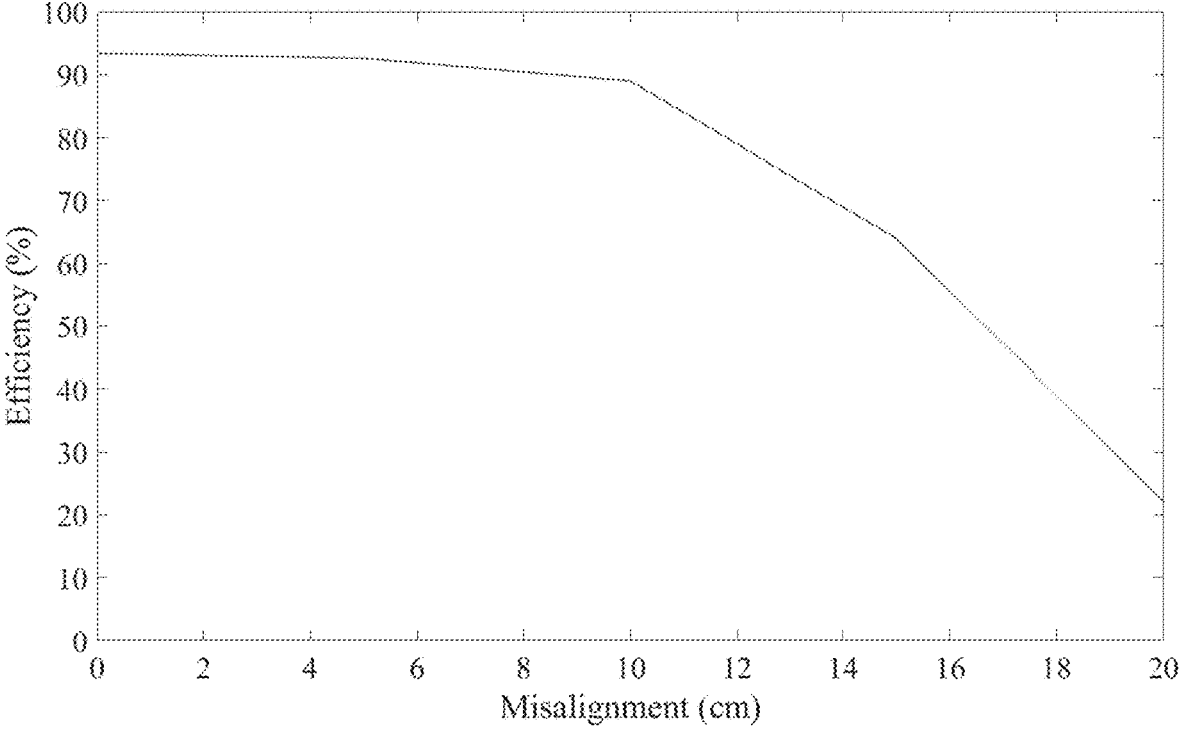
FIG. 12 shows ta plot of efficiency (in percentage (%)) versus misalignment (in cm), showing the efficiency of an IPT system without using a self-alignment mechanism according to an embodiment of the subject invention.

FIG. 12 shows the efficiency of the IPT system at different misalignment conditions without using the self-alignment mechanism as disclosed herein, in which the well-aligned state achieved the highest efficiency (93.4%), and by increasing the misalignment, the efficiency dropped. Using the self-alignment mechanism as disclosed herein maintained the efficiency at 93.4%.

The robot was powered by a combined 24 V battery pack (two 12 V batteries), and the supply of power to the robot itself did not introduce any significant power losses.

The required voltage and current for powering each motor were 12 V and 3 Amperes (A), respectively. As the robot incorporated two motors, the power consumption for feeding the robot can be calculated as follows:

$$P_{robot} = 2*V.I = 2*12*3 = 72 \text{ W} \tag{10}$$

This power was supplied from an external battery pack installed beneath the robot chassis. This implies that the power does not come from the inductive charging system, and as such, it does not affect the efficiency of the IPT system. It should be noted that the robot only consumes power for a short period during misalignment. Once full alignment is reached, the robot stops working and remains unpowered, especially during the charging process.

Figure 13:
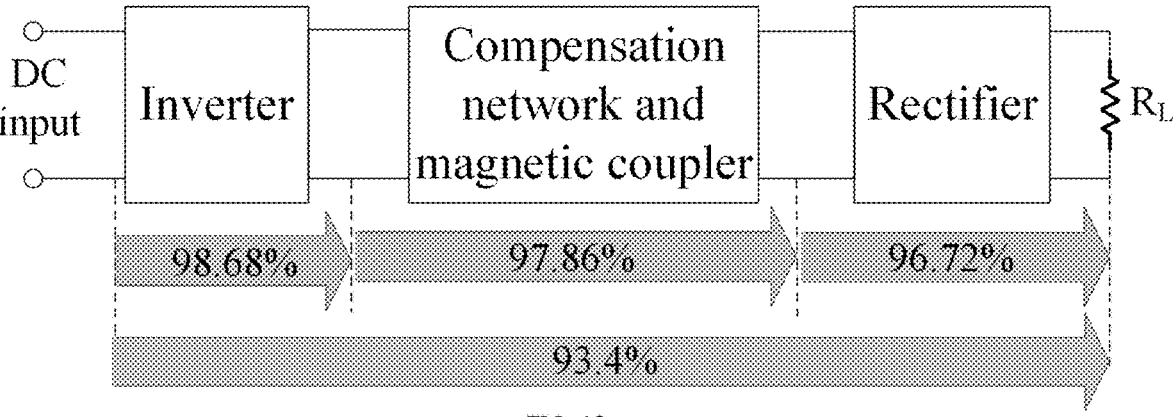
FIG. 13 shows power losses at different sections of an IPT system when deploying a self-aligning mechanism according to an embodiment of the subject invention.

FIG. 13 displays the losses in each section of the IPT system with the implementation of the alignment mechanism as disclosed herein. The robot did not draw power from the IPT system, as it does not have any electrical or magnetic connection with the IPT system, thereby not affecting the efficiency of the system. Moreover, when full alignment is achieved, the robot stops working and is not powered during the operation of the IPT system.

Figure 14A:
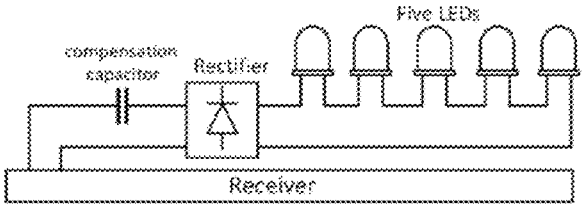
FIG. 14A shows experimental results when the receiver is placed with a 30 cm misalignment. The upper portion of FIG. 14A shows a schematic view of the misalignment, and the lower portion of FIG. 14A shows the B field (in Tesla (T)).
Figure 14A:
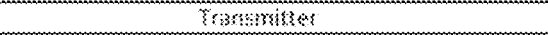
Figure 14A:
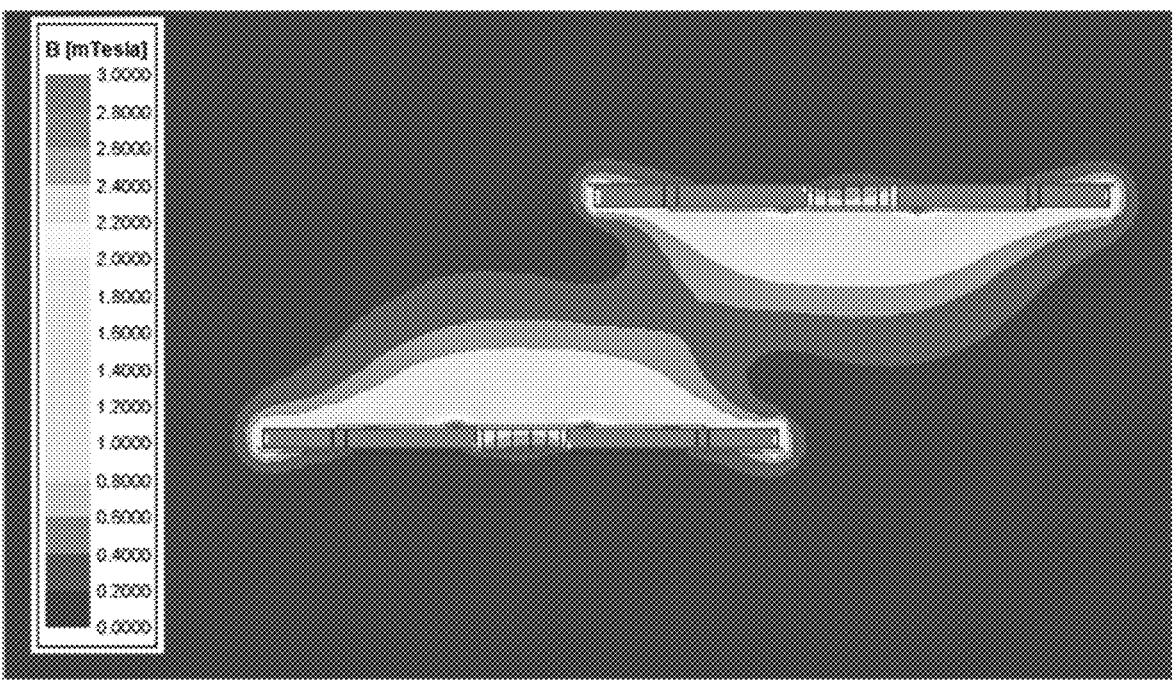
Figure 14B:
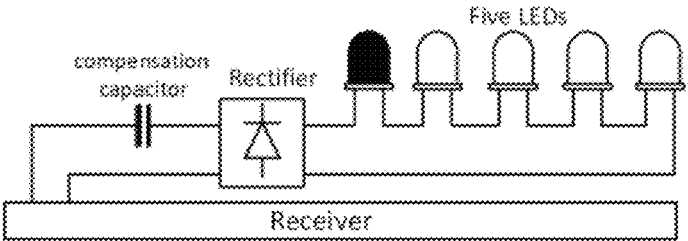
FIG. 14B shows experimental results when the receiver is placed with a 20 cm misalignment. The upper portion of FIG. 14B shows a schematic view of the misalignment, and the lower portion of FIG. 14B shows the B field (in T).
Figure 14B:
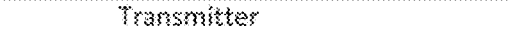
Figure 14B:
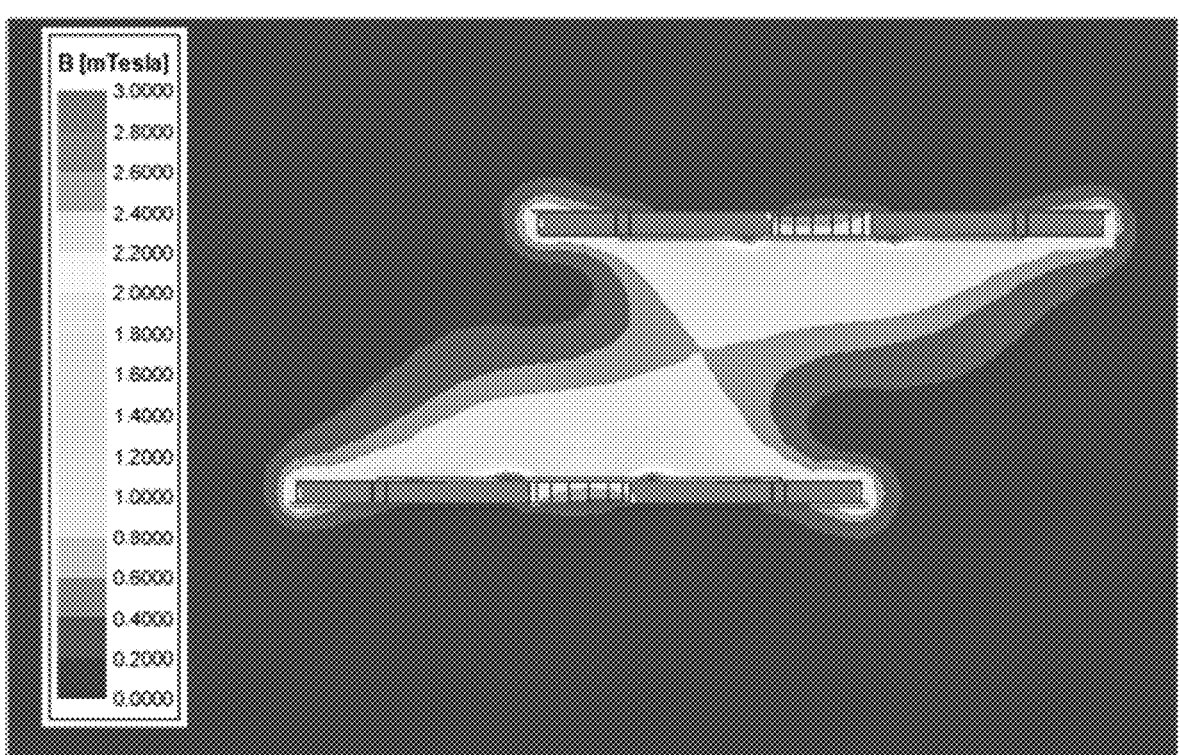
Figure 14C:
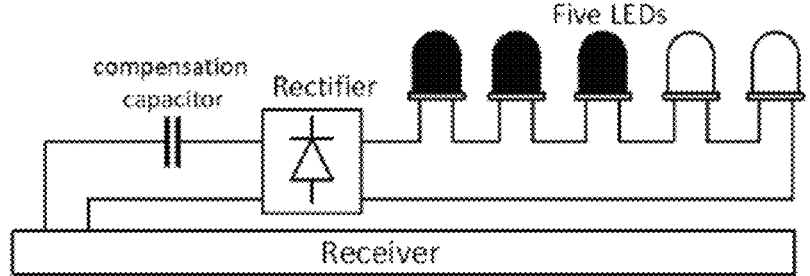
FIG. 14C shows experimental results when the receiver is placed with a 10 cm misalignment. The upper portion of FIG. 14C shows a schematic view of the misalignment, and the lower portion of FIG. 14C shows the B field (in T).
Figure 14C:
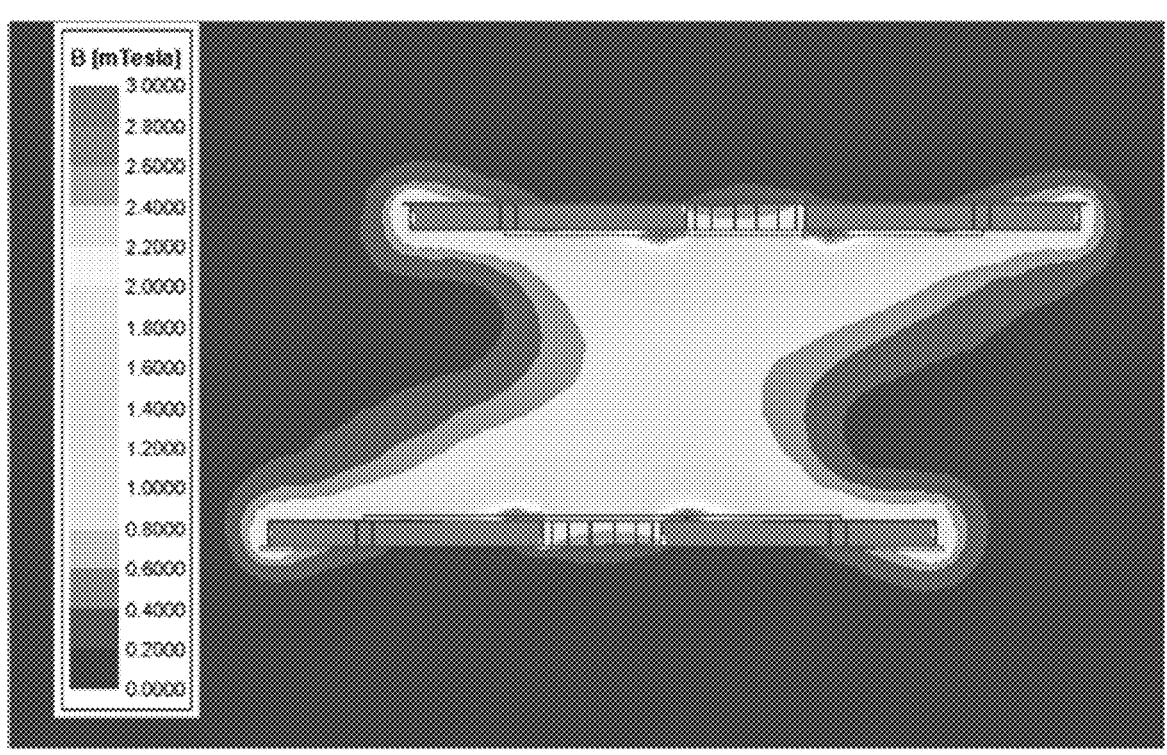
Figure 14D:
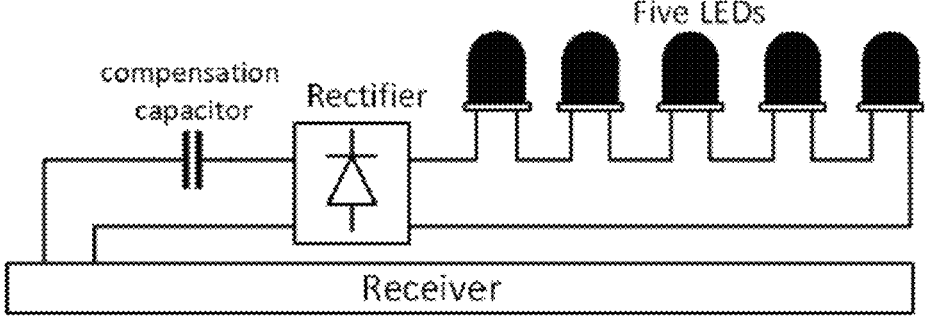
FIG. 14D shows experimental results when the receiver is placed in a well-aligned state (e.g., less than 0.5 cm misalignment, such as 0 cm misalignment). The upper portion of FIG. 14D shows a schematic view of the alignment, and the lower portion of FIG. 14D shows the B field (in T).
Figure 14D:
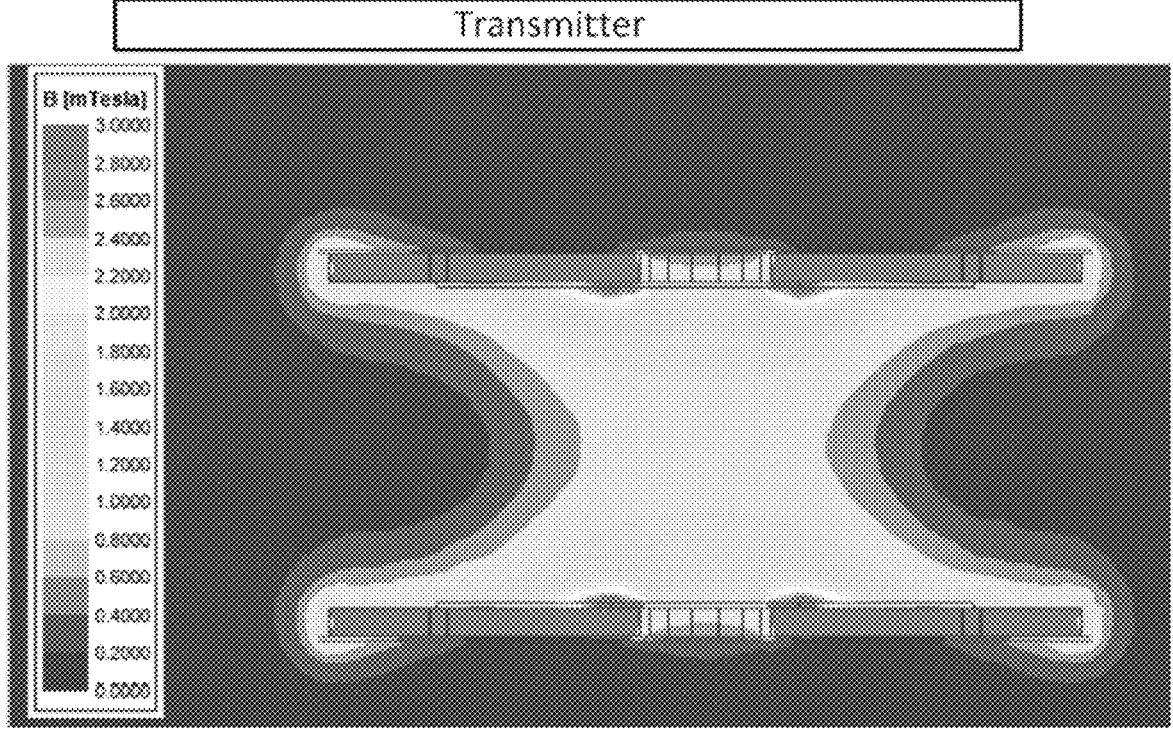

To test the effectiveness of the autonomous self-aligning mechanism as disclosed herein, the receiver was placed with a 30 cm misalignment with respect to the transmitter coil mounted on the robot. The magnetic field sensor at the center of the transmitter's coil read the magnetic field value, and by using the algorithm (see also FIG. 9), the robot moved forward to find the magnetic field value at the well-aligned state. When the transmitter's coil mounted on the robot reached the alignment point, the robot was stopped. The alignment was created automatically and without human intervention or interference. FIGS. 14A-14D show the experimental results of the autonomous self-aligning mechanism as the transmitter's coil on the robot automatically followed the receiver to make the alignment. Schematic views of the four different misalignment/alignment cases are included with the respective magnetic field distributions in FIGS. 14A-14D. Five light emitting diodes (LEDs) were connected in series at the output side of the IPT system to show whether the power was transferred or not in different misalignment cases. These five LEDs were connected in series; therefore, 25 V was required to turn the LEDs on. As shown in FIG. 14A, the receiver was placed with a 30 cm misalignment, and the LEDs were off, indicating that no power was transferring. The robot started traveling toward the receiver to find full alignment by comparing the magnetic field value sensed by the magnetic field sensor at the time with the highest value of the magnetic field. The image of its movement at 20 cm misalignment is provided in FIG. 14B, where a relative alignment was created, and the magnetic field sensor sensed a weak magnetic field, which turned a few LEDs on with a dim light. The robot moved further so that the sensor could read the high magnetic field close to the value in the well-aligned case, and the image at 10 cm misalignment is shown in FIG. 14C. Because a partial alignment occurred at 10 cm misalignment, the sensor could sense the magnetic field in the partial alignment, so some of the LEDs were turned on. The robot moved further to find the well-aligned state, and as the full alignment happened as the sensor sensed the highest magnetic field strength, the robot stopped. At this point, which is shown in FIG. 14D, all the LEDs turned on, meaning that full power was being transferred.

Embodiments of the subject invention provide systems and methods for autonomous self-alignment during wireless charging (e.g., during EV wireless charging) and address the misalignment issue in the stationary wireless charging of EVs. The mechanism uses a robot to move the transmitter to follow the receiver pad based on measuring the magnetic field. The forward self-aligned algorithm was implemented in the laboratory. The experimental results validated the effectiveness of the autonomous self-aligning mechanism in making alignment between the transmitter's coil and receiver coil.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for improving misalignment during wireless charging, the system comprising:

a plate that is configured to be mobile;

a transmitter coil disposed on the plate and configured to perform wireless charging with a receiver coil;

a compensation inductor magnetically integrated with the transmitter coil;

a reverse coil magnetically integrated with the transmitter coil, the magnetic integration of the compensation inductor with the reverse coil reducing mutual inductance variation due to coil misalignment;

a metamaterial disposed proximate to the transmitter coil, the metamaterial having a periodic structure that enables negative refraction, enhances magnetic field distribution near the receiver coil, improves magnetic coupling between the transmitter coil and the receiver coil, and increases system efficiency;

a single magnetic field sensor disposed on the plate;

at least one motor disposed on the plate and configured to move the plate; and a controller in operable communication with the single magnetic field sensor, the controller being configured to perform the following steps during wireless charging:

i) receive, from only the single magnetic field sensor during wireless charging, a measurement of a magnetic field of the transmitter coil;

ii) determine, based only on the measurement of the magnetic field of the transmitter coil received from only the single magnetic field sensor, whether the transmitter coil is in alignment with the receiver coil;

iii) upon determining that the transmitter coil is in alignment with the receiver coil, send a stop signal to the plate such that the plate does not move;

iv) upon determining that the transmitter coil is not in alignment with the receiver coil, send a move signal to the plate such that the at least one motor causes the plate to move; and v) repeat steps i)-iv) until the controller determines that the transmitter coil is in alignment with the receiver coil, such that the plate consumes power only during periods of misalignment and, upon achieving full alignment, ceases movement and remains unpowered throughout the charging process.

2. The system according to claim 1, the plate comprising wheels, the wheels comprising caster wheels configured to permit movement in multiple directions, provide mechanical stability, and form a firm foundation.

3. The system according to claim 1, the single magnetic field sensor being a Hall effect sensor.

4. The system according to claim 1, the controller being a microcontroller.

5. The system according to claim 1, the controller being a proportional-integral-derivative (PID) controller.

6. The system according to claim 1, further comprising:

a compensation network connected to the transmitter coil;

a value-based feedback mechanism configured to provide feedback signals based on magnetic field strength and alignment status; and

an inverter configured to supply a square wave voltage to the compensation network and to adjust output of the inverter in response to the value-based feedback.

7. The system according to claim 1, the determining of whether the transmitter coil is in alignment with the receiver coil comprising:

ii-a) upon receiving the measurement of the magnetic field of the transmitter coil a first time, labeling the measurement of the magnetic field of the transmitter coil as a previous sensor value;

ii-b) upon receiving the measurement of the magnetic field of the transmitter coil each time subsequent to the first time, after the plate has moved, labeling the measurement of the magnetic field of the transmitter coil as a current sensor value;

ii-c) comparing the current sensor value to the previous sensor value;

ii-d) upon the current sensor value being the same as the previous sensor value or within a predetermined tolerance value of the previous sensor value, determining that the transmitter coil is in alignment with the receiver coil;

ii-e) upon the current sensor value being different than the previous sensor value by more than the predetermined tolerance value, determining that the transmitter coil is not in alignment with the receiver coil; and ii-f) relabeling the current sensor value as the previous sensor value.

8. The system according to claim 7, the sending of the move signal to the plate comprising:

iv-a) upon the current sensor value being less than the previous sensor value by more than the predetermined tolerance value, sending a first direction move signal to the plate such that the at least one motor causes the plate to move in a first direction; and iv-b) upon the current sensor value being greater than the previous sensor value by more than the predetermined tolerance value, sending a second direction move signal to the plate such that the at least one motor causes the plate to move in a second direction opposite to the first direction.

9. The system according to claim 1, the determining of whether the transmitter coil is in alignment with the receiver coil comprising:

ii-a) comparing the measurement of the magnetic field of the transmitter coil to a predetermined threshold value;

ii-b) upon the measurement of the magnetic field of the transmitter coil being equal to the predetermined threshold value or within a predetermined tolerance value of the predetermined threshold value, determining that the transmitter coil is in alignment with the receiver coil; and ii-c) upon the measurement of the magnetic field of the transmitter coil being different from the predetermined threshold value by more than the predetermined tolerance value, determining that the transmitter coil is not in alignment with the receiver coil.

10. The system according to claim 1, the transmitter coil being configured to wirelessly charge an electric vehicle (EV).

11. A method for improving misalignment during wireless charging, the method comprising:

1) providing a plate that is configured to be mobile;

2) disposing on the plate a transmitter coil that is configured to perform wireless charging with a receiver coil;

3) magnetically integrating a compensation inductor with the transmitter coil;

4) magnetically integrating a reverse coil with the transmitter coil, the integration of the compensation inductor with the reverse coil mitigating variations in mutual inductance caused by misalignment;

5) providing a metamaterial configured to improve misalignment performance, the metamaterial having a periodic arrangement that enables negative refraction, enhances magnetic field distribution around the receiver coil, improves coupling between the transmitter coil and the receiver coil, and increases system efficiency, 6) disposing on the plate a single magnetic field sensor;

7) disposing on the plate at least one motor that is configured to move the plate;

8) performing wireless charging using the transmitter coil;

9) during the wireless charging:

i) receiving, by a controller, from only the single magnetic field sensor during the wireless charging, a measurement of a magnetic field of the transmitter coil, the controller being in operable communication with the single magnetic field sensor;

ii) determining, by the controller, based only on the measurement of the magnetic field of the transmitter coil received from only the single magnetic field sensor, whether the transmitter coil is in alignment with the receiver coil;

iii) upon determining that the transmitter coil is in alignment with the receiver coil, sending, by the controller, a stop signal to the plate such that the plate does not move;

iv) upon determining that the transmitter coil is not in alignment with the receiver coil, sending, by the controller, a move signal to the plate such that the at least one motor causes the plate to move; and v) repeating steps ii)-iv) until the controller determines that the transmitter coil is in alignment with the receiver coil, such that the plate consumes power only during periods of misalignment and, upon achieving full alignment, ceases movement and remains unpowered throughout the charging process.

12. The method according to claim 11, the plate comprising wheels, the wheels comprising caster wheels configured to permit movement in multiple directions, provide mechanical stability, and form a firm foundation.

13. The method according to claim 11, the single magnetic field sensor being a Hall effect sensor.

14. The method according to claim 11, the controller being a microcontroller.

15. The method according to claim 11, the controller being a proportional-integral-derivative (PID) controller.

16. The method according to claim 11, further comprising:

connecting a compensation network to the transmitter coil;

connecting an inverter to the compensation network;

providing feedback signals based on magnetic field strength and alignment status via a value-based feedback mechanism; and supplying, by the inverter, a square wave voltage to the compensation network and adjusting output of the inverter in response to the value-based feedback.

17. The method according to claim 11, the determining of whether the transmitter coil is in alignment with the receiver coil comprising:

ii-a) upon receiving the measurement of the magnetic field of the transmitter coil a first time, labeling the measurement of the magnetic field of the transmitter coil as a previous sensor value;

ii-b) upon receiving the measurement of the magnetic field of the transmitter coil each time subsequent to the first time, after the plate has moved, labeling the measurement of the magnetic field of the transmitter coil as a current sensor value;

ii-c) comparing the current sensor value to the previous sensor value;

ii-d) upon the current sensor value being the same as the previous sensor value or within a predetermined tolerance value of the previous sensor value, determining that the transmitter coil is in alignment with the receiver coil;

ii-e) upon the current sensor value being different than the previous sensor value by more than the predetermined tolerance value, determining that the transmitter coil is not in alignment with the receiver coil; and ii-f) relabeling the current sensor value as the previous sensor value.

18. The method according to claim 17, the sending of the move signal to the plate comprising:

iv-a) upon the current sensor value being less than the previous sensor value by more than the predetermined tolerance value, sending a first direction move signal to the plate such that the at least one motor causes the plate to move in a first direction; and iv-b) upon the current sensor value being greater than the previous sensor value by more than the predetermined tolerance value, sending a second direction move signal to the plate such that the at least one motor causes the plate to move in a second direction opposite to the first direction.

19. The method according to claim 11, the determining of whether the transmitter coil is in alignment with the receiver coil comprising:

ii-a) comparing the measurement of the magnetic field of the transmitter coil to a predetermined threshold value;

ii-b) upon the measurement of the magnetic field of the transmitter coil being equal to the predetermined threshold value or within a predetermined tolerance value of the predetermined threshold value, determining that the transmitter coil is in alignment with the receiver coil; and ii-c) upon the measurement of the magnetic field of the transmitter coil being different from the predetermined threshold value by more than the predetermined tolerance value, determining that the transmitter coil is not in alignment with the receiver coil.

20. A system for improving misalignment during wireless charging of an electric vehicle (EV), the system comprising:

a plate that is configured to be mobile;

a transmitter coil disposed on the plate and configured to perform wireless charging with a receiver coil;

a compensation inductor magnetically integrated with the transmitter coil;

a reverse coil magnetically integrated with the transmitter coil, the magnetic integration of the compensation inductor with the reverse coil reducing mutual inductance variation due to coil misalignment;

a metamaterial disposed proximate to the transmitter coil, the metamaterial having a periodic structure that enables negative refraction, enhances magnetic field distribution near the receiver coil, improves magnetic coupling between the transmitter coil and the receiver coil, and increases system efficiency;

a single magnetic field sensor disposed on the plate;

at least one motor disposed on the plate and configured to move the plate;

a controller in operable communication with the single magnetic field sensor;

a compensation network connected to the transmitter coil;

a value-based feedback mechanism configured to provide feedback signals based on magnetic field strength and alignment status; and an inverter configured to supply a square wave voltage to the compensation network and to adjust output of the inverter in response to the value-based feedback, the controller being configured to perform the following steps during wireless charging:

i) receive, from only the single magnetic field sensor during wireless charging, a measurement of a magnetic field of the transmitter coil;

ii) determine, based only on the measurement of the magnetic field of the transmitter coil received from only the single magnetic field sensor, whether the transmitter coil is in alignment with the receiver coil;

iii) upon determining that the transmitter coil is in alignment with the receiver coil, send a stop signal to the plate such that the plate does not move;

iv) upon determining that the transmitter coil is not in alignment with the receiver coil, send a move signal to the plate such that the at least one motor causes the plate to move; and v) repeat steps i)-iv) until the controller determines that the transmitter coil is in alignment with the receiver coil, such that the plate consumes power only during periods of misalignment and, upon achieving full alignment, ceases movement and remains unpowered throughout the charging process, the plate comprising wheels, the wheel comprising caster wheels configured to permit movement in multiple directions, provide mechanical stability, and form a f rm foundation, the single magnetic field sensor being a Hall effect sensor, the controller being a proportional-integral-derivative (PID) controller, the determining of whether the transmitter coil is in alignment with the receiver coil comprising:

ii-a) upon receiving the measurement of the magnetic field of the transmitter coil a first time, labeling the measurement of the magnetic field of the transmitter coil as a previous sensor value;

ii-b) upon receiving the measurement of the magnetic field of the transmitter coil each time subsequent to the first time, after the plate has moved, labeling the measurement of the magnetic field of the transmitter coil as a current sensor value;

ii-c) comparing the current sensor value to the previous sensor value;

ii-d) upon the current sensor value being the same as the previous sensor value or within a predetermined tolerance value of the previous sensor value, determining that the transmitter coil is in alignment with the receiver coil;

ii-e) upon the current sensor value being different than the previous sensor value by more than the predetermined tolerance value, determining that the transmitter coil is not in alignment with the receiver coil; and ii-f) relabeling the current sensor value as the previous sensor value, and the sending of the move signal to the plate comprising:

iv-a) upon the current sensor value being less than the previous sensor value by more than the predetermined tolerance value, sending a first direction move signal to the plate such that the at least one motor causes the plate to move in a first direction; and iv-b) upon the current sensor value being greater than the previous sensor value by more than the predetermined tolerance value, sending a second direction move signal to the plate such that the at least one motor causes the plate to move in a second direction opposite to the first direction.

\*  \*  \*  \*  \*